(12) United States Patent
McKinley

(10) Patent No.: US 10,711,761 B2
(45) Date of Patent: Jul. 14, 2020

(54) HYDROKINETIC POWER SOURCE

(71) Applicant: Mark McKinley, Vienna, VA (US)

(72) Inventor: Mark McKinley, Vienna, VA (US)

(*) Notice: Subject to any disclaimer, the term of this patent is extended or adjusted under 35 U.S.C. 154(b) by 69 days.

(21) Appl. No.: 15/822,631

(22) Filed: Nov. 27, 2017

(65) Prior Publication Data

US 2018/0080431 A1 Mar. 22, 2018

Related U.S. Application Data

(63) Continuation of application No. 14/491,689, filed on Sep. 19, 2014, now Pat. No. 9,835,130.

(60) Provisional application No. 61/880,243, filed on Sep. 20, 2013.

(51) Int. Cl.
*F03B 17/06* (2006.01)
*F03B 13/10* (2006.01)
*F03B 13/26* (2006.01)

(52) U.S. Cl.
CPC .............. *F03B 17/06* (2013.01); *F03B 13/10* (2013.01); *F03B 13/264* (2013.01); *F05B 2240/12* (2013.01); *Y02E 10/22* (2013.01); *Y02E 10/28* (2013.01)

(58) Field of Classification Search
CPC ....... Y02E 10/20; Y02E 10/28; F03B 13/264; F03B 17/06
See application file for complete search history.

(56) References Cited

U.S. PATENT DOCUMENTS

| | | |
|---|---|---|
| 237,851 A | 2/1881 | Foskett |
| 827,839 A | 8/1906 | Smith |
| 830,973 A | 9/1906 | De Camp |
| 984,266 A | 2/1911 | Doney |
| 1,000,351 A | 8/1911 | Symons |
| 1,302,889 A | 5/1919 | Albisu |
| 1,479,216 A | 1/1924 | Bott |
| 2,465,285 A | 3/1949 | Schwickerath |
| 4,389,843 A | 6/1983 | Lamberti |
| 4,560,884 A | 12/1985 | Whittecar |
| 5,324,169 A | 6/1994 | Brown et al. |
| 5,548,956 A | 8/1996 | Price |
| 5,708,305 A | 1/1998 | Wolfe |
| 5,899,664 A | 5/1999 | Lawrence |
| 6,392,314 B1 | 5/2002 | Dick |

(Continued)

OTHER PUBLICATIONS

"Technology: Oscillating Hydrofoil," http://www.esru.strath.ac.uk/EandE/Web_sites/05-06/marine_renewables/technology/oschydro.htm, 6 pages, (2005).

(Continued)

*Primary Examiner* — Michael Leslie
(74) *Attorney, Agent, or Firm* — The Marbury Law Group PLLC

(57) ABSTRACT

A system is provided. The system includes a body having at least two surfaces. The body is configured to be located at least partially below a surface of a body of water moving in a first direction. The system includes a mechanical system connected to the body. The mechanical system is configured to allow the movement of the body of water in the first direction to move the body back and forth in a plane parallel to the surface of the body of water in a second direction and a third direction. The second and the third directions are substantially perpendicular to the first direction. The mechanical system is configured to translate the movement of the body to a rotor of an electrical generator.

5 Claims, 31 Drawing Sheets

(56) References Cited

U.S. PATENT DOCUMENTS

| | | |
|---|---|---|
| 7,023,104 B2 | 4/2006 | Kobashikawa et al. |
| 7,045,912 B2 | 5/2006 | Leijon et al. |
| 7,245,041 B1 | 7/2007 | Olson |
| 7,315,092 B2 | 1/2008 | Cook |
| 7,456,512 B2 | 11/2008 | Nadel |
| 7,598,624 B2 | 10/2009 | Loui et al. |
| 7,632,069 B2 | 12/2009 | Kelley |
| 7,839,009 B2 | 11/2010 | Rink |
| 8,049,357 B2 | 11/2011 | Saavedra |
| 8,884,457 B1 | 11/2014 | Jones |
| 9,835,130 B1 | 12/2017 | McKinley |

OTHER PUBLICATIONS

"A Moving Fluid's Kinetic Energy," http://wdstudio.net/gulfstreamturbine/kinetic.htm, 6 pages (2014).

"Betz's Law," http://en.wikipedia.org/wiki/Betz's_law, 8 pages, (2014).

"bioSTREAM BioPower Systems," http://www.biopowersystems.com/biostream.html, 1 page, (2014).

"File:Aeroforces," http://en.wikipedia.org/wiki/File:Aeroforces.svg, 3 pages, (2014).

"File:Streamlines around a NACA 0012," http://en.wikipedia.org/wiki/File:Streamlines_around_a_NACA_0012.svg, 2 pages (2014).

"File:Wing profile nomenclature," http://en.wikipedia.org/wiki/File:Wing_profile_nomenclature.svg, 4 pages, (2014).

Shivers, J. P. et al., "Effects of Compressibility on Rotor Hovering Performance and Synthesized Blade-Section Characteristics Derived from Measured Rotor Performance of Blades Having NACA 0015 Airfoil Tip Sections," National Advisory Committee for Aeronautics, Technical Note 4356, 29 sheets, (1958).

"Making Tidal Power a Commercial Reality," http://pulsetidal.com, 17 pages, (2014).

Stingray Tidal Stream Energy Device-Phase 2, T06/00218/00REP, URN 03/1433, The Engineering Business Ltd., (2003), 34 pages.

"Tidal Stream Generator," http://en.wikipedia.org/wiki/Tidal_stream_generator, 12 pages, (2014).

"Vortex Hydro Engergy," http://www.vortexhydroenergy.com, (2014), 18 pages.

Han, R., "Development and Study of a Hydro-kinetic Power-generating Device for Use in River and Tidal Environments," http://ine.uaf.edu/werc/seminars/1-october-2010/, (2010), 1 page.

"Research and Development of a 150kW Tidal Stream Generator," ETSU T/06/00211/00REP, DTI pub URN No. 02/1400, The Engineering Business Ltd., (2002), 53 pages.

Ragheb, M. "Wind Energy Conversion Theory, Betz Equation," (2014), 24 pages.

"The Betz Limit—and The Maximum Efficiency for Horizontal Axis Wind Turbines," http://www.wind-power-program.com/betz.htm, Dec. 2005, 5 pages.

Molland, A.F. et al., "Marine Rudders and Control Surfaces," p. 79, (2007), Published by Elsevier Ltd.

Molland, A.F. et al., "Marine Rudders and Control Surfaces," Experimental Data for Rudder Behind Propeller, p. 125, (2007), Published by Elsevier Ltd.

Molland, A.F. et al., "Marine Rudders and Control Surfaces," p. 210, (2007), Published by Elsevier Ltd.

Molland, A.F. et al., "Marine Rudders and Control Surfaces," p. 90, (2007), Published by Elsevier Ltd.

115

115

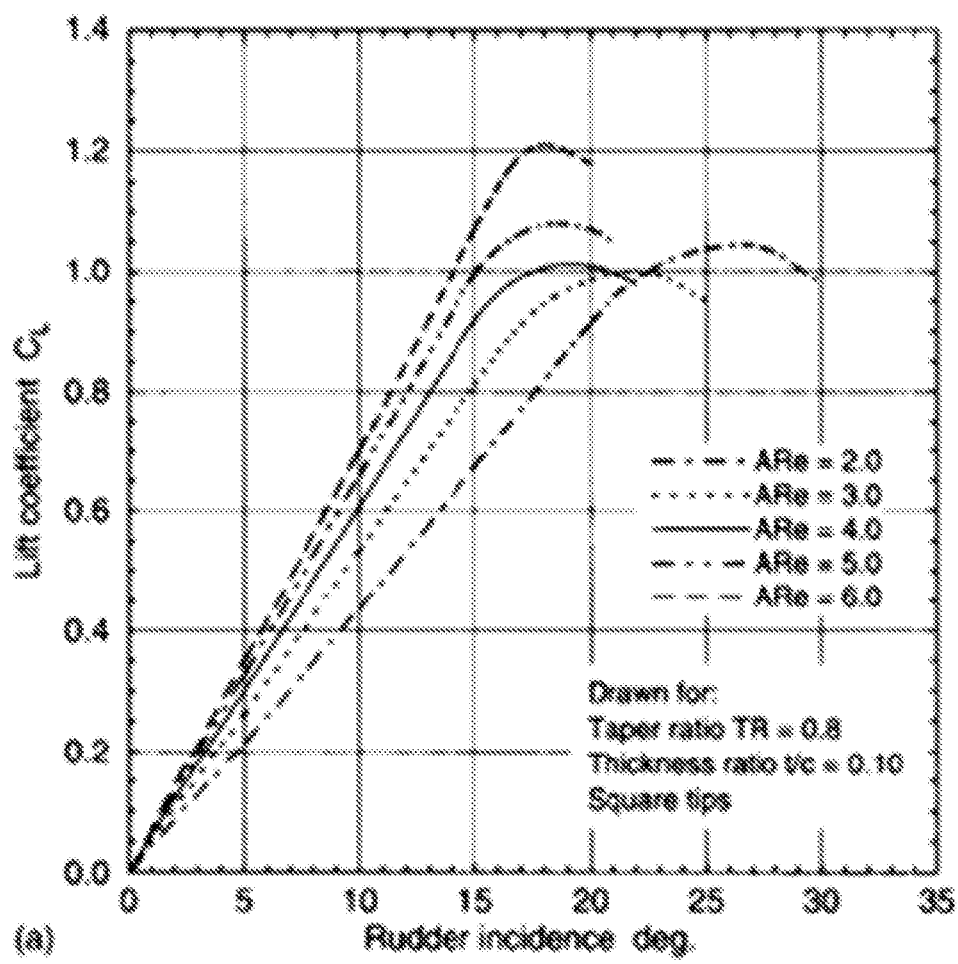
(a)
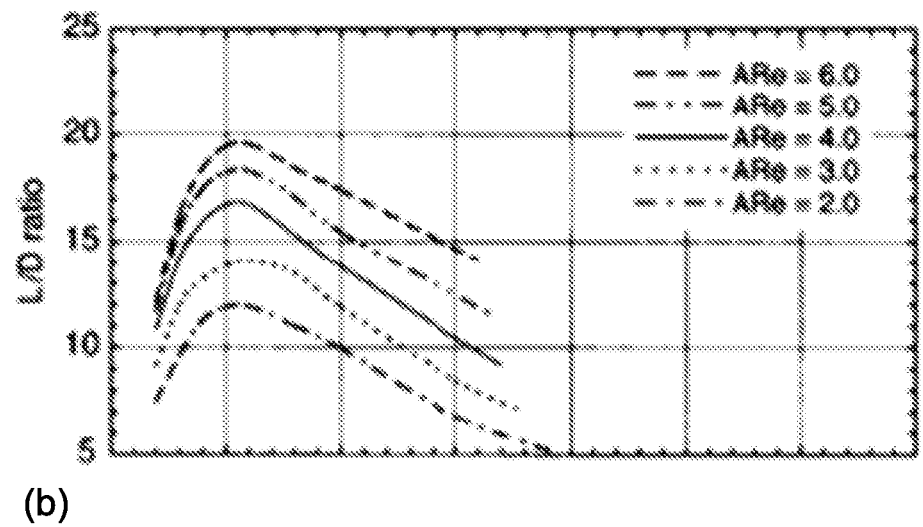
(b)
FIG. 19

HYDROKINETIC POWER SOURCE

CROSS REFERENCE TO RELATED APPLICATIONS

This application is a continuation of U.S. application Ser. No. 14/491,689, filed Sep. 19, 2014, issued as U.S. Pat. No. 9,835,130, on Dec. 5, 2017, which claims the benefit of U.S. Provisional Application No. 61/880,243, filed Sep. 20, 2013. The 61/880,243, and Ser. No. 14/491,689, applications are incorporated by reference herein, in their entirety, for all purposes.

TECHNICAL FIELD

The present disclosure generally relates to power sources and, more particularly, to hydrokinetic power sources.

BACKGROUND

As the demand for electrical power increases over the past decades, more and more hydroelectric power plants have been built to convert hydropower into electricity. The hydroelectric power plants, however, cause serious damages to the natural ecosystem. For example, dams often block the natural migration paths of fish. In addition, building dams and reservoirs involve large scale of displacing people, particularly in third-world countries where population is dense. Moreover, when dams become aged and start to degrade, they become a threat to people living downstream. Thus, there is a need to develop new technologies that are more environmental friendly to utilize the hydropower.

SUMMARY

In one embodiment, a tidal power source is disclosed. The tidal power source includes a body having at least two surfaces located at least partially below a surface of a body of water moving in a given first direction. For example, the body of water may be a river that has a current flow direction and the body may comprise a floating body, such as a hull or a boat, which is partially submerged in the body of water and partially extending out of the body of water. In some embodiments, the body may be completely submerged in the body of water.

The body moves back and forth in a plane parallel to the surface of the body of water in second and third directions, which are substantially perpendicular to the first direction. For example, the second direction may be between 75 and 105 degrees, such as 85 to 95 degrees, including 90 degrees with respect to the first direction, while the third direction may be between 255 and 285 degrees, such as 265 to 275 degrees, including 270 degrees with respect to the first direction. The body moves back and forth from one part of the body of water to a second part and back. For example, the body may move from one bank of a river to the opposite bank of the river and back, under the power of the river current.

When the body moves in the second direction (e.g., to the right bank of the river), a first surface, such as a first side surface of the body is impacted by the water flowing in the first direction. Preferably, the first surface is positioned at an angle greater than zero but less than 90 degrees (i.e., between parallel and perpendicular), such as 10-80 degrees with respect to the first (i.e., current flow) direction.

When the body reaches a first predetermined point in the body of water (e.g., at or near the right bank), the body is turned using either the power of the flowing water and/or electrical or mechanical power such that the second surface, such as a second side surface of the body is impacted by the water flowing in the first direction. In some embodiments, the second surface is positioned at an angle greater than 0 (e.g., greater than 180 if the angle is counted with respect to the angle of the first surface) but less than 90 (e.g., less than 270 degrees) (i.e., between parallel and perpendicular), such as 10-80 degrees with respect to the first direction. This turn causes the body to move in the third direction (e.g., to the left bank of the river) using the power of the flowing water.

When the body reaches a second predetermined point in the body of water (e.g., at or near the left bank), the body is turned using either the power of the flowing water and/or electrical or mechanical power such that the first surface is again impacted by the water flowing in the first direction, causing the body to move back in the second direction.

In some embodiments, the water does not completely rotate the body around its axis (e.g., similar to a turbine), but instead moves the body substantially linearly substantially perpendicular to the water (e.g., current) flow direction.

In some embodiments, the body is kept with one side (e.g., first or second side) facing the current while moving in one direction (e.g., second or third direction, respectively) and then turned such that the opposite side faces the current while the body is moving in the opposite direction. The force of the flowing water may be used to carry out this function by including any suitable direction delimiter/mechanical turning device. In the non-limiting embodiments described below, the direction delimiter/mechanical turning device includes a tie arm and two control arms. A transition mechanism described below moves a pin connected to the body between two positions in the tie arm between the control arms. In some embodiments, a single arm having an adjustable length may be used. The arm length may be adjusted by an electronic control system, such as a computer controlling hydraulics and/or servo motors.

For example, as described in more detailed below, the floating body may comprise a hull. The hull may include an elongated body having first and second side surfaces that will be exposed to the current. The first and second side surfaces may be bowed out and connected to each other by sharp edges at the front and back of the body. In some embodiments, the longer first and second side surfaces may be connected to each other by shorter third front and/or fourth rear surfaces. Other body configurations may also be used, such as bodies having triangular, oval, rectangular, or other polygonal shapes when viewed from above (i.e., normal to the body of water).

The floating body may be movably connected to a stationary support structure which is attached to a bottom of the body of water and/or to the shore. In some embodiments, the connection is made above the surface of the body of water.

In some embodiments, the body, such as the hull, is movably connected to a support structure, such as a stanchion fixed to a bottom of a river by a movable power arm assembly. In some embodiments, the body may be movably connected to a stanchion or another suitable support structure (e.g., support post) located on the shore of the river by a cable (e.g., "clothes line" loop type cable that is movable in the second and third directions around pulleys or drums) or another connecting structure that allows the body to move with respect to the river current. In some embodiments, the body is directly or indirectly connected to one or more rails that extend non-parallel (e.g., substantially perpendicular)

with respect to the first (i.e., current flow) direction, which allows the body to move in the second and third directions along the one or more rails.

The movement of the body is translated into electrical energy using a generator or another suitable electricity generation device. Any suitable piston or crankshaft type translational mechanism may be used to translate the movement of the body to directly or indirectly rotate a rotor of a generator. For example, the power arm assembly may be connected to a flywheel, which is in turn directly or indirectly connected to a moving part (e.g., rotor) of an electrical generator located outside the body of the water (e.g., on shore). In some embodiments, a cable or another connection device may be used to directly or indirectly turn the rotor of a generator. In some embodiments, the generator may be located on or in the moving body, and the movement of the moving body is translated to turning of the generator rotor using any suitable mechanical connection.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

FIG. 19 illustrates a relationship between the lift coefficient, lift and drag ratio, aspect ratio, and angle of attack for a marine rudder.

DETAILED DESCRIPTION

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

The various embodiments provide a machine designed for converting hydrokinetic energy, such as in river, tidal, and ocean currents, into mechanical energy that may be used for generating electric power. The machine may include a structure including a surface placed against current flow to maximize hydrokinetic forces. The surface may be attached to a leverage arm to generate high moments from relatively slow currents. The machine may be scaled to fit different current sizes, shapes, or flow rates. In various embodiments, the machine may be easily maintained. Some of the mechanical components in the machine may be disposed above or below the water's surface and some electrical systems may be disposed above or below the water's surface. In some embodiments, multiple machines may be interconnected to form a larger system operating a single generator.

Design Approach

Figure 1:
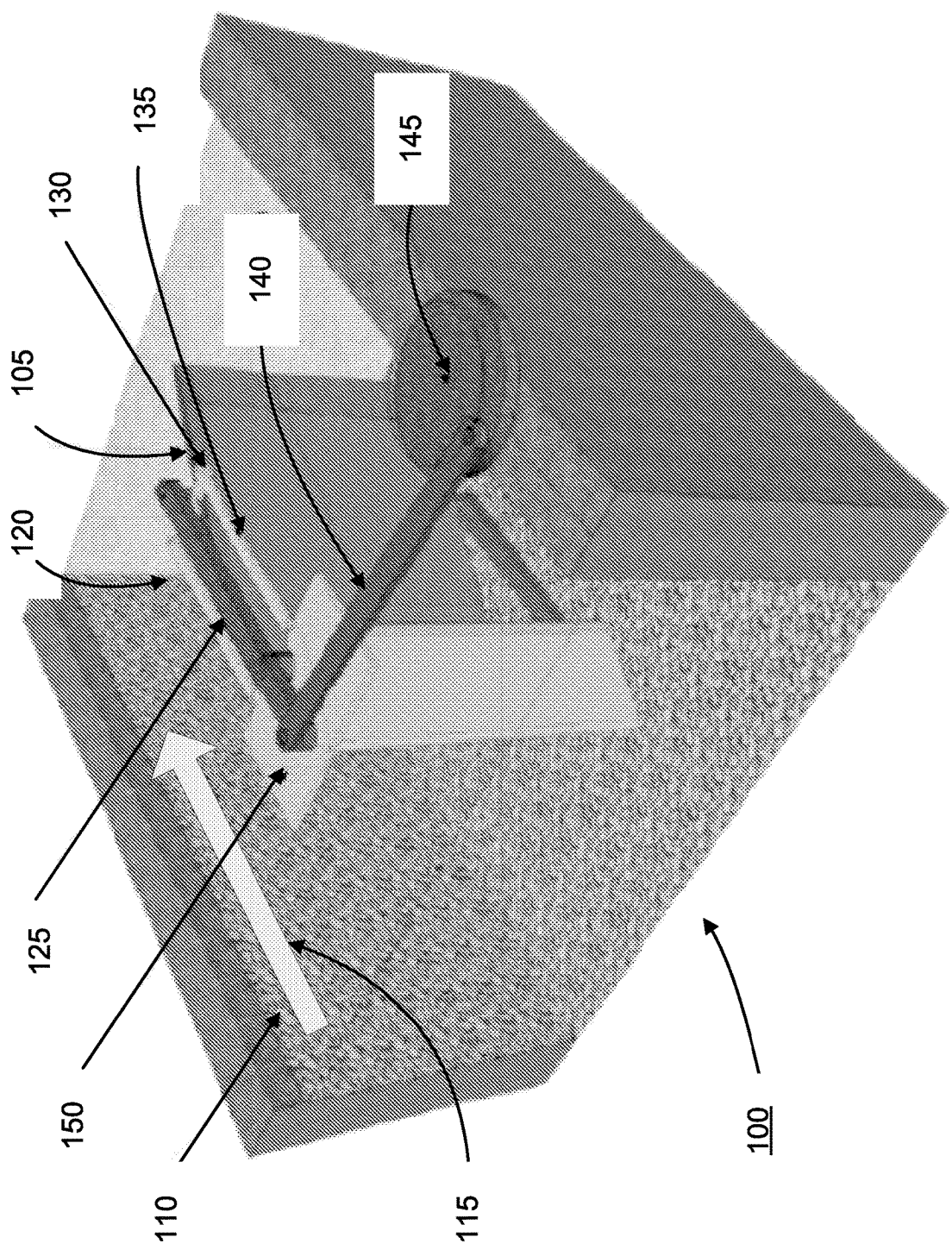
FIG. 1 is a schematic view of a hydrokinetic power source in accordance with the present disclosure.

FIG. 1 illustrates an exemplary hydrokinetic power source 100 (e.g., a machine 100 or hydrokinetic power generator 100) configured to convert hydrokinetic energy of the water into mechanical power by translating a structure or body, such as a hull 105, across an open current 115 in a body of water 110, such as a river. The hull 105 includes at least two surfaces, with a first surface (e.g., one visible in FIG. 1) facing toward the current 115 at an angle (e.g., angle of attack), and a second surface facing away from the current 115. The angle of attack of the first surface is defined as the angle formed by the axis of symmetry between the two surfaces of the hull 105 and the direction or the reverse direction of the current 115.

The hydrokinetic power source 100 may automatically adjust an angle of attack of the hull 105 to ferry the hull back and forth across the current 115. The hull 105 may traverse the current 115 at a predetermined velocity and acceleration pattern. The velocity and acceleration of the hull 105 may be determined by varying the angle of attack of the hull 105 with respect to the current 115. The angle of attack of the hull 105 may be controlled by a mechanical system 120. The mechanical system 120 may be connected to a generator (not shown) to produce electricity using the mechanical power converted from the hydrokinetic power. For example, the hull 105 may be connected to a generator (not shown) through a push arm 140 and a flywheel 145 to develop a smooth and consistent rotation of the generator. In some embodiments, the hull 105 may be exposed to the greatest amount of current possible to maximize the power extracted. The hull 105 may be designed to be deep, narrow, and relatively long (in the current flow direction) to expose the greatest surface area possible to the current, generating the greatest force possible on the hull 105.

Hull Control

Figure 2:
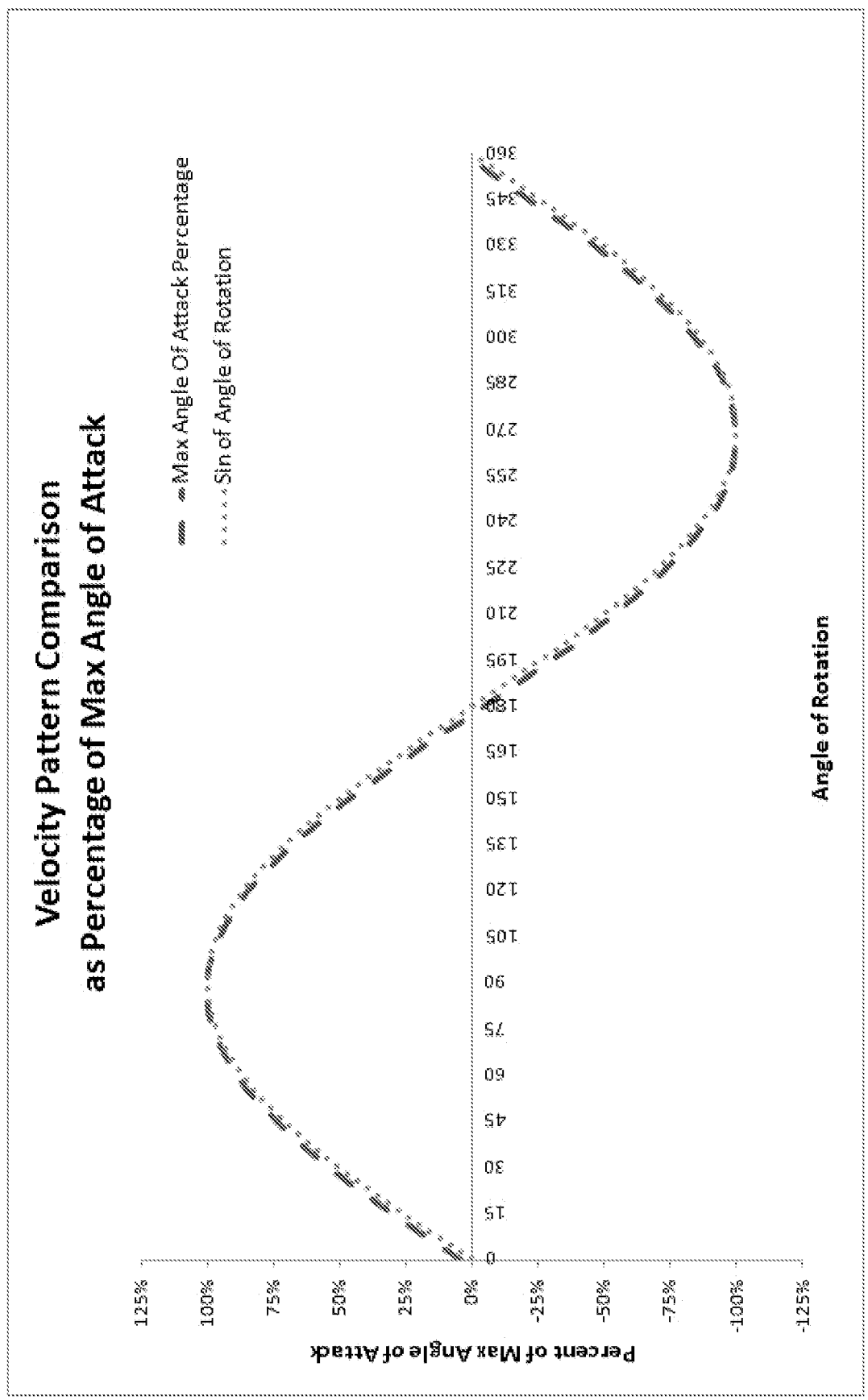
FIG. 2 illustrates a velocity pattern comparison as percentage of maximum angle of attack in accordance with the present disclosure.

In various embodiments, the hull 105 may traverse the current 115 in a nearly linear pattern. The velocity and acceleration of the hull 105 may be controlled to translate the nearly linear motion into a rotational motion. FIG. 2 illustrates the velocity pattern comparison as percentage of maximum angle of attack. Where there is a constant current velocity, controlling the hull's near linear traverse to a velocity pattern that closely follows a sine pattern will translate the movement to a relatively consistent angular velocity of rotations for a rotating body like a flywheel or generator. The hull's velocity is directly correlated with its angle of attack. The control system is specifically designed to vary the hull's angle of attack, as compared to the max angle of attack, to generate a relatively smooth rotation of an attached generator. For example, the hull 105 may start with a zero angle of attack at the initial position and gradually increase the angle of attack up to a maximum angle of attack in the center of the current 115. The angle of attack may be reduced back down to zero by the end of the traverse. In some embodiments, this variation in the angle of attack may closely approximate a sine function, as shown in FIG. 2. The variation in angle of attack as the hull 105 traverses the current 115 may drive the push arm 140 attached to the hull 105 to turn a generator at a relatively constant rotational speed.

In various embodiments, the hull 105 may be supported by a stanchion 150 located in the center of the current 115. Like a bridge stanchion, the stanchion 150 may provide the structural support for the hydrokinetic power source (e.g., machine) 100. The stanchion 150 may be located upstream from the hull 105. The hull 105 may be connected to the stanchion 150 through a power arm assembly 125. The power arm assembly 125 may be hinged at the stanchion 150, as shown in FIG. 1, allowing the power arm assembly 125 to swing to left and to right as the hull 105 traverses the current 115. The power arm assembly 125 may be attached adjacent the center portion of the top and bottom surfaces of the hull 105 with a hinge connection to allow the hull 105 to rotate with respect to the power arm assembly 125. The power arm assembly 125 and stanchion 150 may provide the required support of the hull 105 as the hull 105 traverses the current 115.

Figure 3:
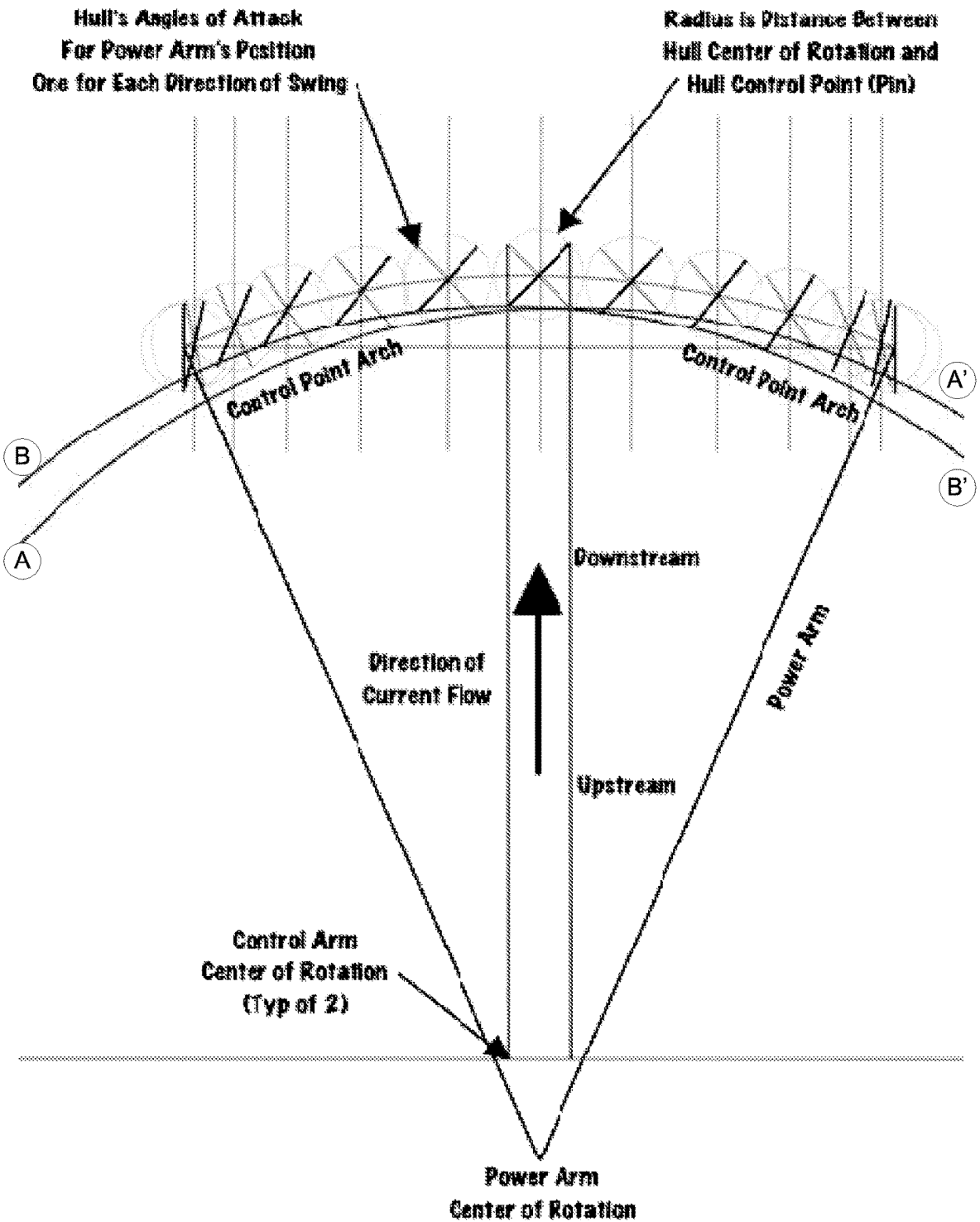
FIG. 3 illustrates the angle of attack at each hull position as the hull swings in accordance with the present disclosure.

By connecting the hull 105 to the power arm assembly 125, the hull 105 may not traverse the current 115 in an exactly linear path. The path of the hull 105 may have a slight arch, as shown in FIG. 3 and discussed below. The extent of the arch may be based on the length of the power arm assembly 125 and the width of the current 115 (or river 110). If the arch is kept to a minimum, the track of the hull 105 may closely approximate a linear track.

The hull 105 may be a long, narrow, and deep structure designed to rotate with respect to the power arm assembly 125. The power arm assembly 125 connection point may be located downstream from the geometric center or center of hydrostatic force of the hull 105, making the hull 105 unstable. A control pin 210 (shown in FIG. 7, which also corresponds to a control point) may be located upstream from the geometric center of the hull 105. The water current may force the hull 105 to turn to one side or the other.

The control pin 210 may be centered on the hull 105 and upstream of the pivot point of the power arm assembly 125. The path of the control points, if plotted, may closely resemble a circular curve with a different radius and center than the power arm assembly 125, as shown in FIG. 3. The control pin 210 may connect the hull 105 with a tie arm 130 and a control arm 135 on one side or both sides of the power arm assembly 125. The center of the control arm 135 may be located downstream from the center of the power arm assembly 125 and to the side of center of the current 115 corresponding to the direction of travel (as shown by the arrow 115). The location of the center of the control arm 135 may be dependent on the maximum angle of attack and the separation between the control point and connection point of the hull 105 to the power arm assembly 125. This may provide the control of the hull 105 in one direction. To control the hull 105 in the opposite direction of travel, the control points, circle, and center are mirrored. There may be two control arms 135, as shown in FIG. 1, for the hull 105 to switch between at the end of the traversing the current (e.g., the river). At the ends of the traverse, the angle of attack of the hull 105 is at its minimum, so the transition from one control arm to the other may be minimized.

Because the control pin 210 of the hull 105 does not have a fixed point with respect to the control arm 135, the connection of the power arm assembly 125 may be slightly downstream of the geometric center of the hull 105. Moving the connection point of the power arm assembly 125 slightly downstream from the geometric center of the hull 105 provides greater surface area on the leading edge (e.g., the edge facing the current 115) of the hull 105. As a result, the leading edge of the hull 105 may experience greater hydrostatic pressure than the trailing edge (e.g., the edge at the end of the hull 105 in the current flowing direction). This may make the hull 105 unstable when the hull 105 is in parallel with the flow of the current 115. Once the direction of the angle of attack is initiated, the current 115 may keep the hull 105 in that direction until the control arm 135 brings the hull 105 to be in parallel with the flow of the current 115. At that point the hull 105 may become unstable and change the angle of attack (e.g., change direction with respect to the current 115). Again the current 115 may hold the hull 105 in that direction until it comes parallel to the current 115. By offsetting the point of connection of the power arm assembly 125 slightly downstream, the current 115 will maintain the direction of the hull 105 until the hull 105 reaches the end of its traverse.

To facilitate this repetitive traversing action, the control pin 210 (and the corresponding control points) of the hull 105 may be capable of swinging from one control arm to the other. The two control arms 135 may be hinged at their ends located on the stanchion 150. Providing the limited movement of the control pin across the tie arm 130 will facilitate the hull 105 to change direction while maintaining the specified angles of attack profile.

Figure 9:
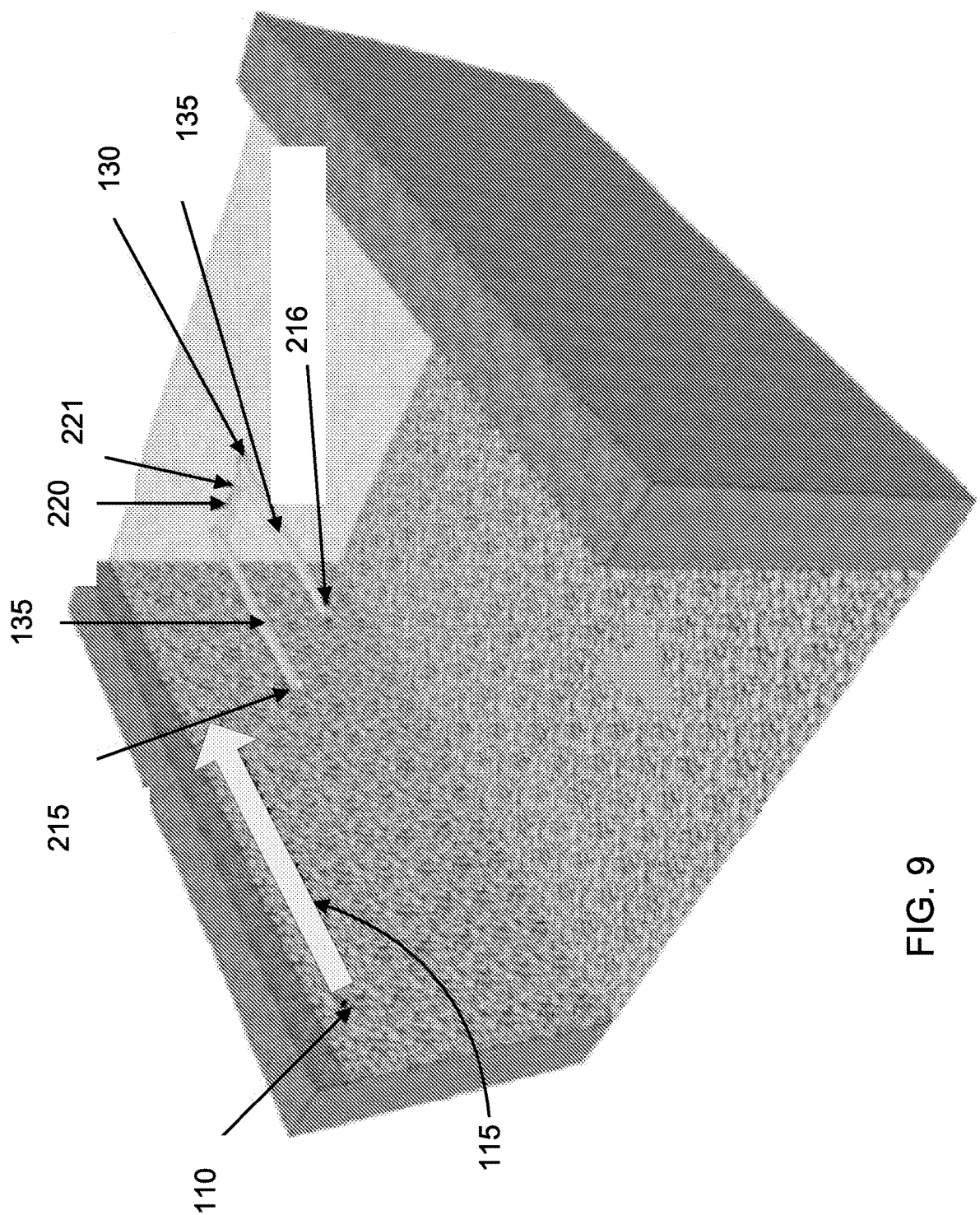
FIG. 9 illustrates a control arm and a tie arm in accordance with the present disclosure.

FIG. 3 illustrates the movement of the hull 105, the power arm assembly 125, and the control arm 135. As shown in FIG. 3, the power arm assembly 125 may rotate from left to right and from right to left. At each location in the rotation path of the power arm assembly 125 (or at each location in the moving path of the hull 105), there is an angle of attack associated with the hull 105. FIG. 3 shows the angle of attack at each location of the hull 105. FIG. 3 also shows two crossing control point trajectories (A-A' and B-B'). The control point is shown in FIG. 9 and discussed below. When the hull 105 swings from the right to the left, the control point trajectory may follow the curve B'-B. When the hull 105 swings from the left to the right, the control point trajectory may follow the curve A-A'. As the hull 105 reaches the leftmost point, the control point may be located at control point B. A control system (which may include the control arm 135) may adjust the control point position from position B to position A, such that when the hull 105 travels from the left to the right, the control point trajectory will follow the curve A-A'. Both trajectories may cross each other at the center where the upper power arm 160 (shown in FIG. 6) of the power arm assembly 125 is in parallel with the direction of current flow.

Hydrokinetic Power Source

Stanchion

Figure 4:
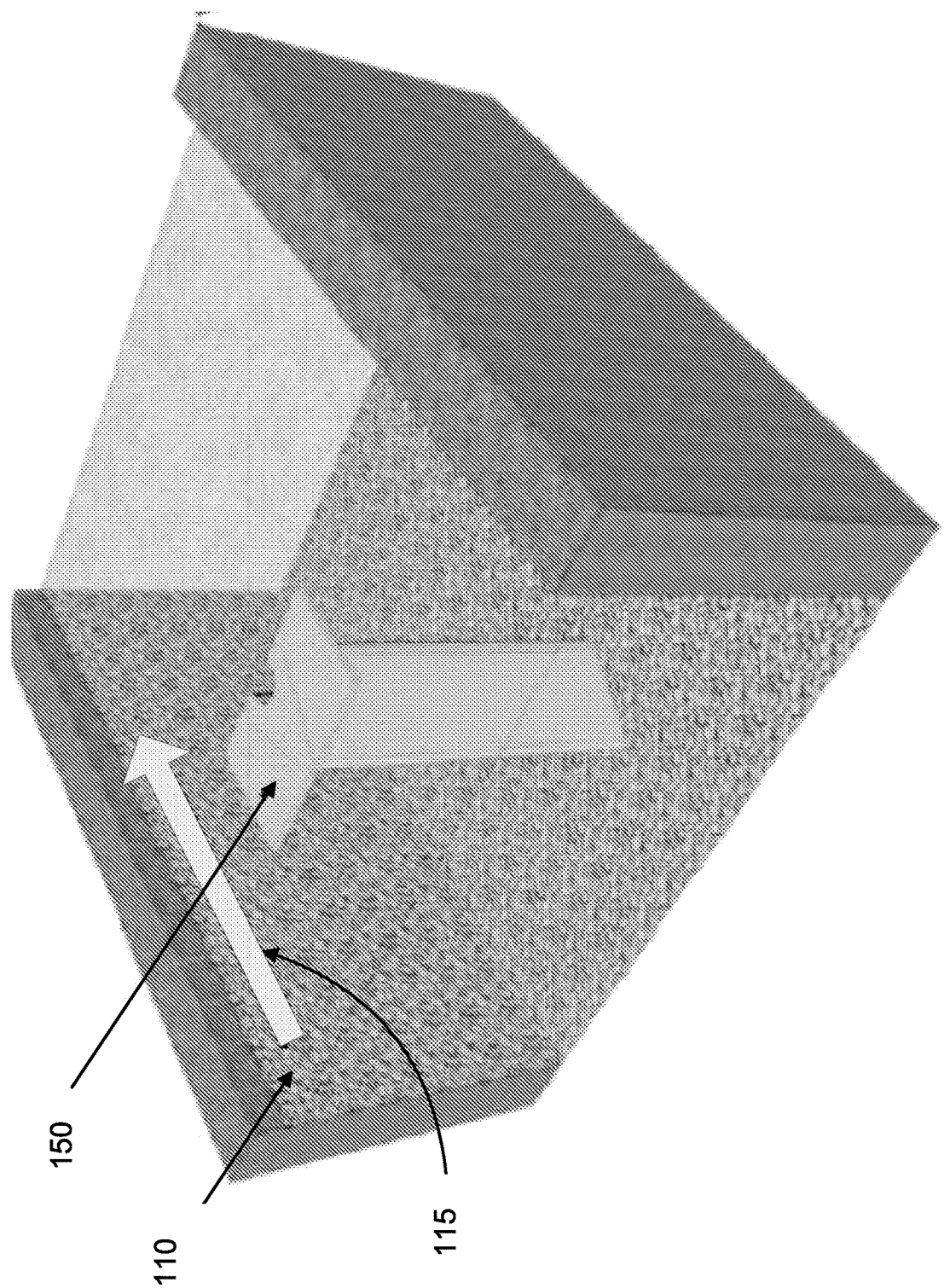
FIG. 4 illustrates a stanchion included in the hydrokinetic power source in accordance with the present disclosure.

The stanchion 150 may be located in the center of the current 115. Like a bridge stanchion, the stanchion 150 may provide the structural support for the hydrokinetic power source 100 and protect the power arm assembly 125 from the current 115. The stanchion 150 may be located upstream from the hull 105, as shown in FIG. 4.

Power Arm Assembly

Figure 5:
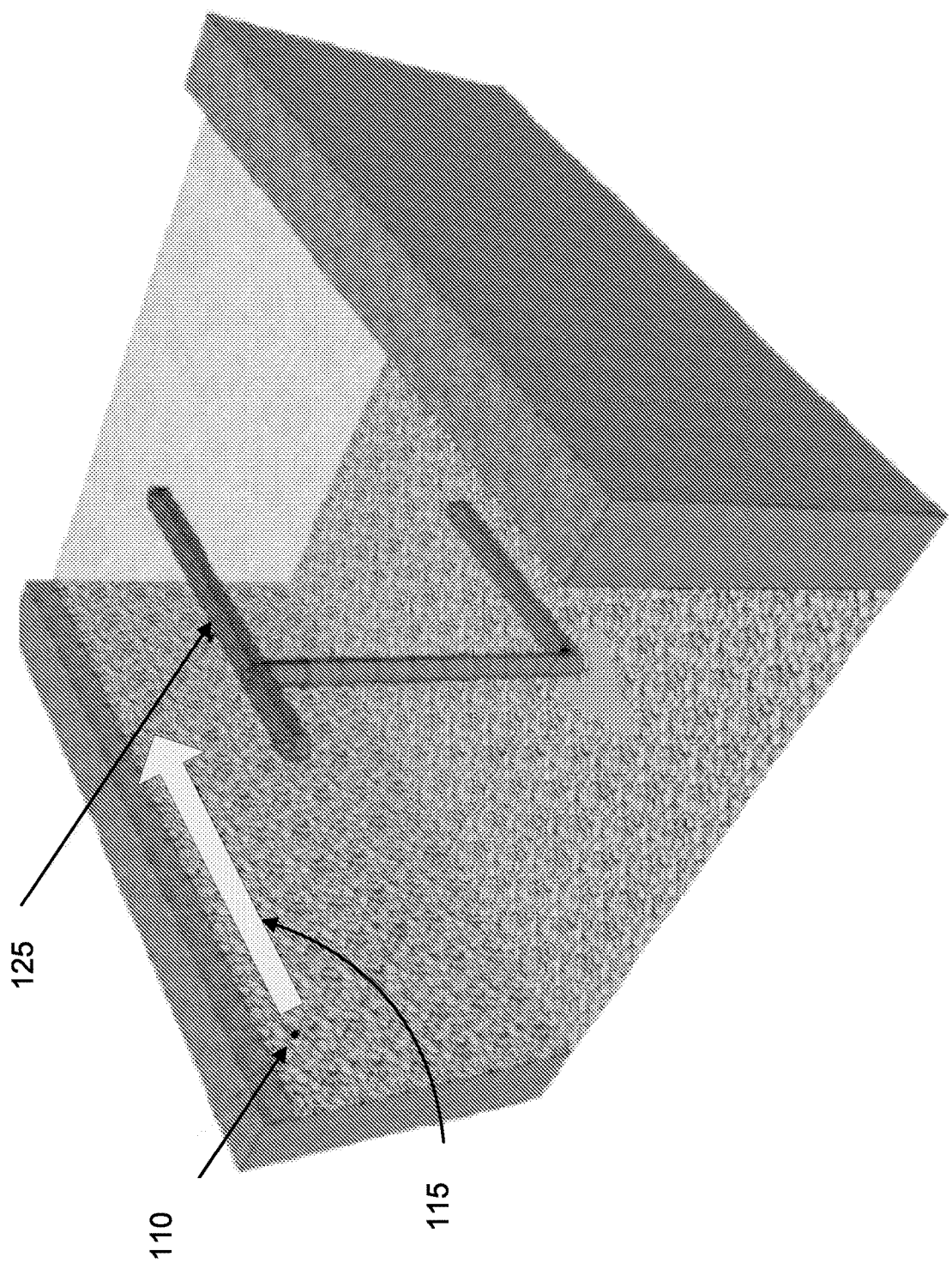
FIG. 5 illustrates a power arm assembly included in the hydrokinetic power source in accordance with the present disclosure.
Figure 6:
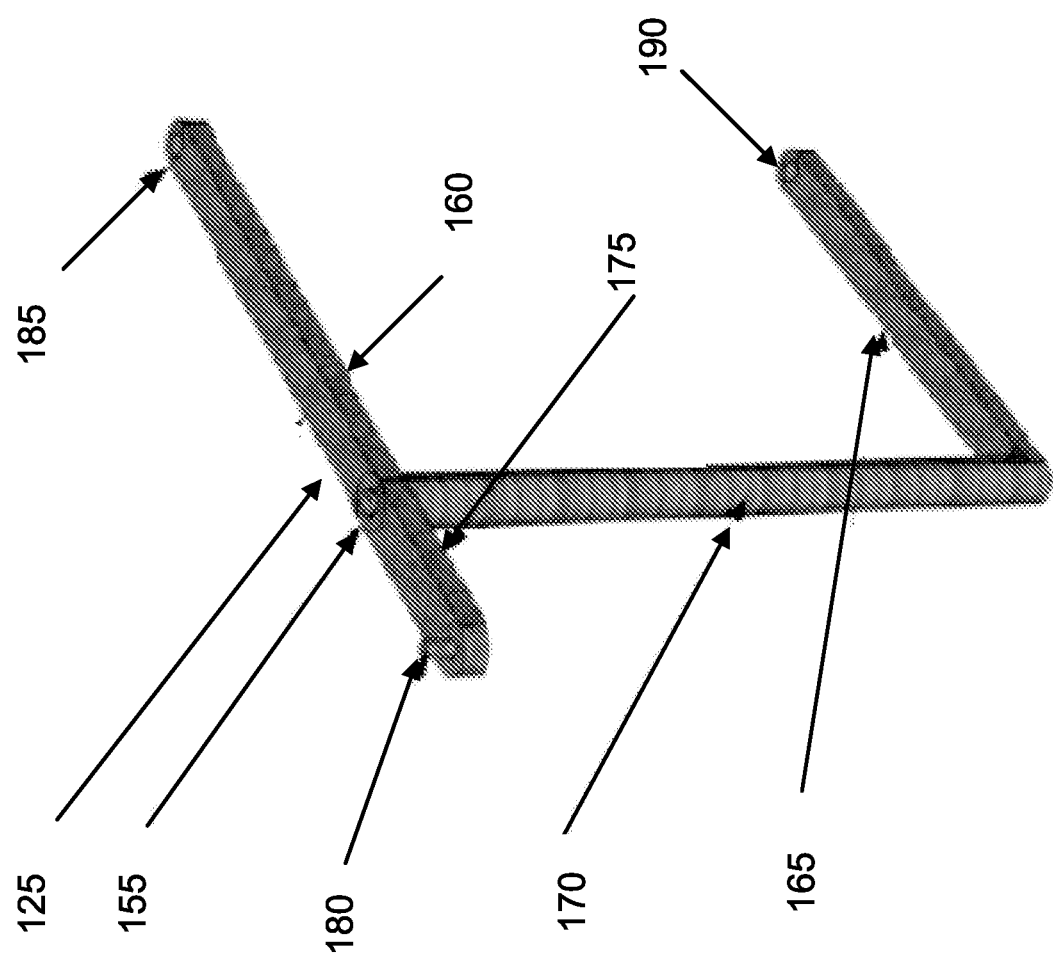
FIG. 6 illustrates components of the power arm assembly in accordance with the present disclosure.

In some embodiments, the hull 105 may be connected to the stanchion 150 through the power arm assembly 125, as shown in FIG. 1. FIGS. 5 and 6 illustrate the structure of the power arm assembly 125. FIG. 5 shows the location of the power arm assembly 125 within the current 115. FIG. 6 shows the components of the power arm assembly 125. As shown in FIG. 6, the power arm assembly 125 may be hinged to the stanchion 150 at a power arm rotation center 155, allowing it to swing to the left and right as the hull 105 traverses the current 115. The power arm assembly 125 may include two power arms, an upper power arm 160 and a lower power arm 165. The upper power arm 160 may be located directly above a lower power arm 165. Both the upper power arm 160 and the lower power arm 165 may be attached to a vertical axle 170. The upper power arm 160 may include a push arm extension 175. The push arm extension 175 may be connected with the upper power arm 160 at the power arm rotation center 155. In some embodiments, the push arm extension 175 may be integral with the upper power arm 160. The push arm 140 may be coupled with the push arm extension 175 through a push arm hinge pin 180. Thus, the push arm 140 may rotate relative to the push arm extension 175. The relative location of the flywheel 145 to the stanchion 150 may determine the angle of the push arm extension 175 relative to the power arms 160 and 165. The power arms 160 and 165 may be attached to the hull 105 adjacent the center of the hull 105 on the top and bottom surfaces, respectively, with hinges at hull hinge points 185 and 190 to allow the hull 105 to rotate with respect to the power arms 160 and 165. The power arm assembly 125 and stanchion 150 may prove support for the hull 105 as it traverses the current 115.

Hull

Figure 7:
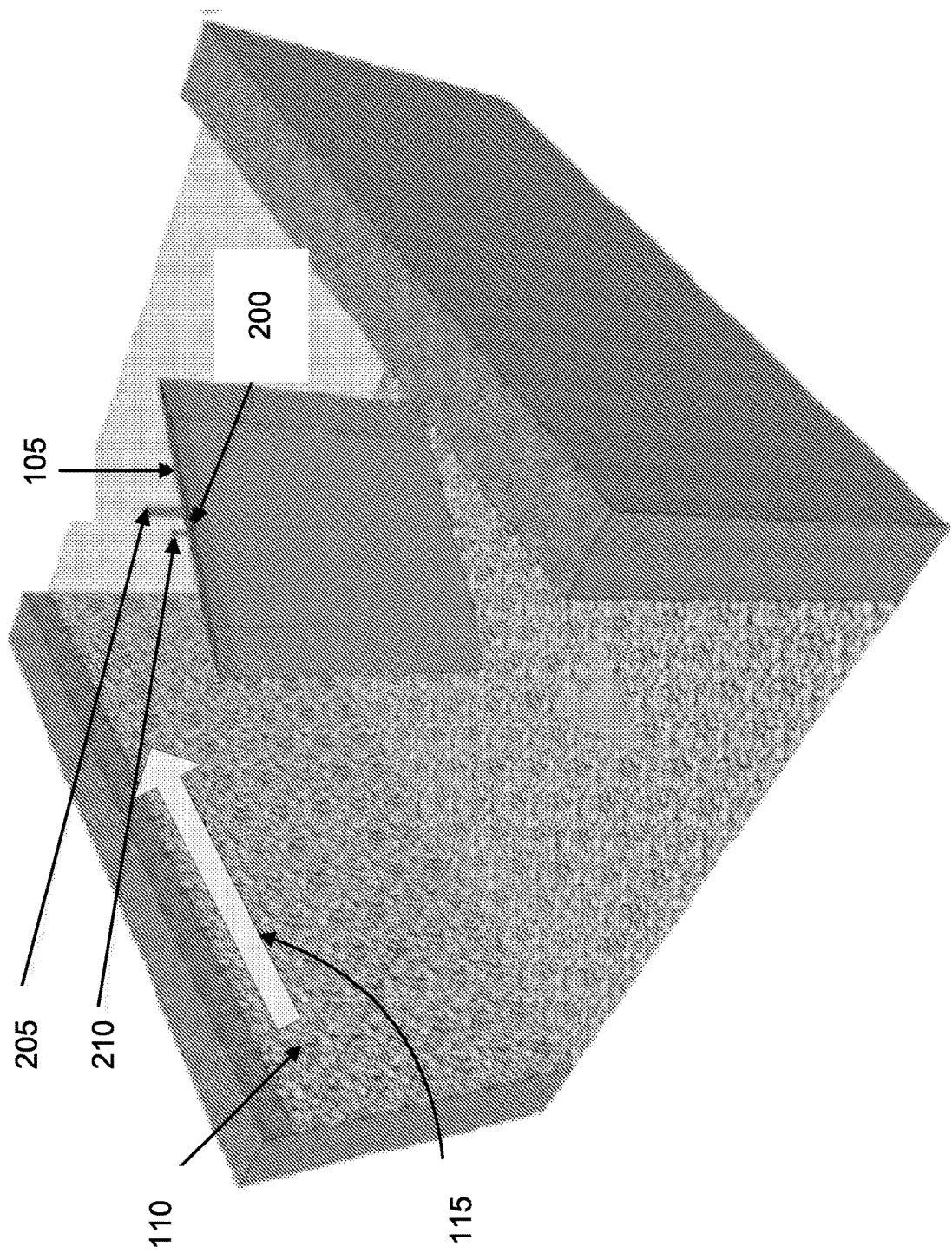
FIG. 7 illustrates a hull in accordance with the present disclosure.
Figure 8:
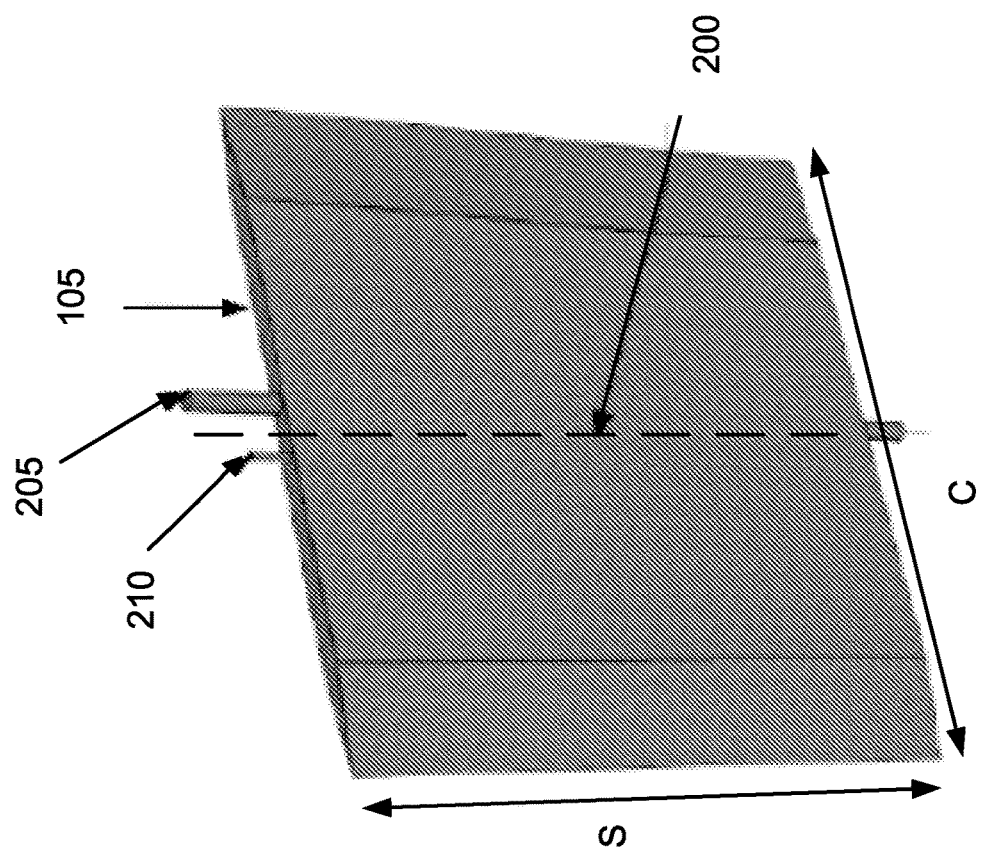
FIG. 8 illustrates the hull in accordance with the present disclosure.

FIGS. 7 and 8 illustrate the hull 105. FIG. 7 illustrates the location of the hull 105 in the hydrokinetic power source 100. FIG. 8 illustrates the configuration of the hull 105. In various embodiments, the hull 105 may be a long (in the current flow direction), narrow (in the thickness direction), and deep (in the water depth direction) structure designed to rotate with respect to the power arm assembly 125. In some embodiments the hull can be equipped with controls surfaces or articulating sections to increase the hydrokinetic forces. The power arm assembly 125 may be connected to the hull 105 through a power arm hinge pin 205 located at the top and bottom surface of the hull 105. For example, the upper power arm 160 may be connected with the hull 105 at the top surface of the hull 105 through the power arm hinge pin 205 located at the top surface, and lower power arm 165 may be connected to the hull 105 at the bottom surface of the hull 105 through the power arm hinge pin 205 located at the bottom surface. The power arm hinge pin 205 may be located downstream from a center of force (e.g., gravity) 200, making the hull unstable. In some embodiments, the center of force 200 may coincide with the geometric center of the hull 105. The control arm 135 may be connected to the hull 105 via the tie arm 130 and a control pin 210. The control pin 210 may be located upstream from the center of force 200 (which may coincide with the geometric center of the hull 105 in some embodiments). That is, in some embodiments, the vertical axis for the center of force 200 may be located between the control pin 210 and the power arm hinge pin 205, as shown in the dashed line in FIG. 8. The current 115 may force the hull 105 to turn to one side or the other (e.g., flip sides so that the surface facing toward the current may be flipped to be facing against the current). The hull 105 may rotate until the control pin 210 lodges in the control point of the tie arm 130. To minimize the vertical forces on the power arm assembly 125, the weight of the hull 105 to buoyancy should be relatively balanced.

The aspect ratio of the hull 105 may be defined by the cord (e.g. length in flow direction) C in the direction of the current 115, and the span S in the depth of the water current (or in the direction traversing the current flow direction), as shown in FIG. 8. The aspect ratio (AR) may be defined as S divided by C, i.e., AR=S/C. The aspect ratio of the hull 105 may be at least less than 0.5 (i.e., the length C in the flow direction is at least 2 times greater than the depth S in the direction traversing the flow direction). In some embodiments, the aspect ratio may be less than 0.25, which means cord C is at least 4 times greater than span S. In other words, in various embodiments, the cord C of the hull 105 may be greater than the span S of the hull 105. Smaller aspect ratio means greater ratio between C and S.

As will be discussed below, in the hydrokinetic power source 100, the power available in the current flow for the hull 105 to convert increases as the aspect ratio AR decreases. Thus, for a given span (depth) S, the longer (greater length C in the current flow direction) of the hull 105, the greater the potential power the hull 105 may convert from the current flow.

The lift force (i.e., the product of the coefficient of lift and the surface area) increases as the aspect ratio decreases. The coefficient of lift decreases as the aspect ratio decreases. The surface area increases at a greater rate as the aspect ratio decreases.

The velocity in the direction of lift, which is normal to the flow direction of the current, increases as the aspect ratio decreases. The maximum angle of attack of a foil (e.g., hull 105) increases as the aspect ratio decreases. The normal velocity is correlated with the angle of attack. Thus, a reduced aspect ratio provides for an increased normal velocity.

The power equals to lift force times normal velocity which increases as the aspect ratio decreases. The potential lift force increases as the aspect ratio decreases. The potential normal velocity increases as the aspect ratio decreases. The product of the potential lift force and the potential normal velocity, i.e., the power, increases as the aspect ratio decreases.

High aspect ratios are for aeronautics and naval architecture, but are not suitable for power generation, such as the hydrokinetic power source 100. For aeronautics and naval architecture designs, high aspect ratios provide the highest lift to drag ratio is achieved at relatively low angle of attack. High aspect ratios are critical in craft design to minimize craft weight and cost of materials. One of the goals for the design of aeronautic architectures is to minimize drag forces on the craft. Minimizing drag forces minimizes required power to drive the craft. Minimizing required power in turn minimizes power plant size. Minimizing power plant size minimizes weight of plant and fuel storage. Minimizing drag forces is essential for reducing the craft's weight, cost, and associated required lifting force. Another goal for the design of aeronautic architectures is to maximize lifting forces on the craft. The coefficient of lift is unit-less but is multiplied by the foil's area to derive the lifting force. Maximizing coefficient of lift minimizes required surface area. Minimizing surface area minimizes weight and material cost. Minimizing weight also reduces associated lifting force. The maximum lift to drag ratio occurs at a relatively low but consistent angle of attack, regardless of aspect ratios. The maximum lift to drag ratio increases as the aspect ratio increases. The acute angles of attack are not appealing from a mechanical design or passenger comfort perspective. The craft design benefits from increased aspect ratio and the resulting increased lift to drag ratio without concern for acute maximum angle of attack. The fundamental design principle in aeronautics and naval architecture is to minimize craft weight and cost.

In the disclosed hydrokinetic power source 100, the hull 105 may be designed to have buoyancy that provides vertical support of the structure (i.e., the hull 105). The hull 105 may be positioned in a strongest current, at least partially above the water surface, at center of the water channel. When the hull 105 is swinging back and forth around the stanchion 150, the buoyancy does not change substantially with the horizontal travel of the hull 105. The current velocity profile is relatively symmetrical around center of travel. The ground effect can occur equally at each end of the hull's travel. For example, the river bank or canal walls may provide ground effect. In open current (water), vertical structures (e.g., walls) may be provided around the hydrokinetic power source 100 to create ground effect. In some embodiments, when multiple hydrokinetic power sources 100 are used together, the timing of the movement of the hulls 105 may be designed such that adjacent hulls 105 may move together and apart in unison and they may provide ground effect for each other. With the hull 105 design in the disclosed hydrokinetic power source 100, the lift does not need to compensate for gravity. To generate consistent forces with vertical motion, as in the aeronautic structures, the lift forces are different. High up lift is needed to overcome the gravity. Down lift is low because gravity is contributing to the overall force. With the horizontal motion of the hull 105, the gravity acts normal to the lift force, so the gravity does not impact the total horizontal force on the hull 105. In addition, with the hull 105 design, the lift does not need to compensate for buoyancy. To generate consistent forces with vertical motion, as in the naval structures, the lift forces are different. The upward lift is low because buoyancy is contributing to the overall force, and the down lift is high so as to overcome the buoyancy forces. With the horizontal motion of the hull 105, the buoyancy forces act normal to the lift force, so the buoyancy forces do not impact the total horizontal forces on the hull 105. The hull 105 designs also minimize inefficiencies of flow at the tip of the foil in drag and lift. The water surface will prevent/minimize flow from high pressure side to low pressure side of the hull 105 which generates vortices at foils tip. In addition, the bottom will prevent/minimize flow from the high pressure side to the low pressure side of the hull 105 which generates vortices at foils tip.

In the hydrokinetic power source 100, the energy of the current (e.g., water flow) may be used for control of the position and/or the angle of attack of the hull 105. The hull 105 may include a primarily geometric (mechanical) control system. The center of force of the hull 105 may be located slightly upstream of the pivot point of the hull 105. The force of the current holds the hull 105 in position with the geometric control system. With the hull 105 design, minimal external control energy is required. Minimizing control energy requirements maximizes net energy output.

Control Arm Assembly

Figure 10:
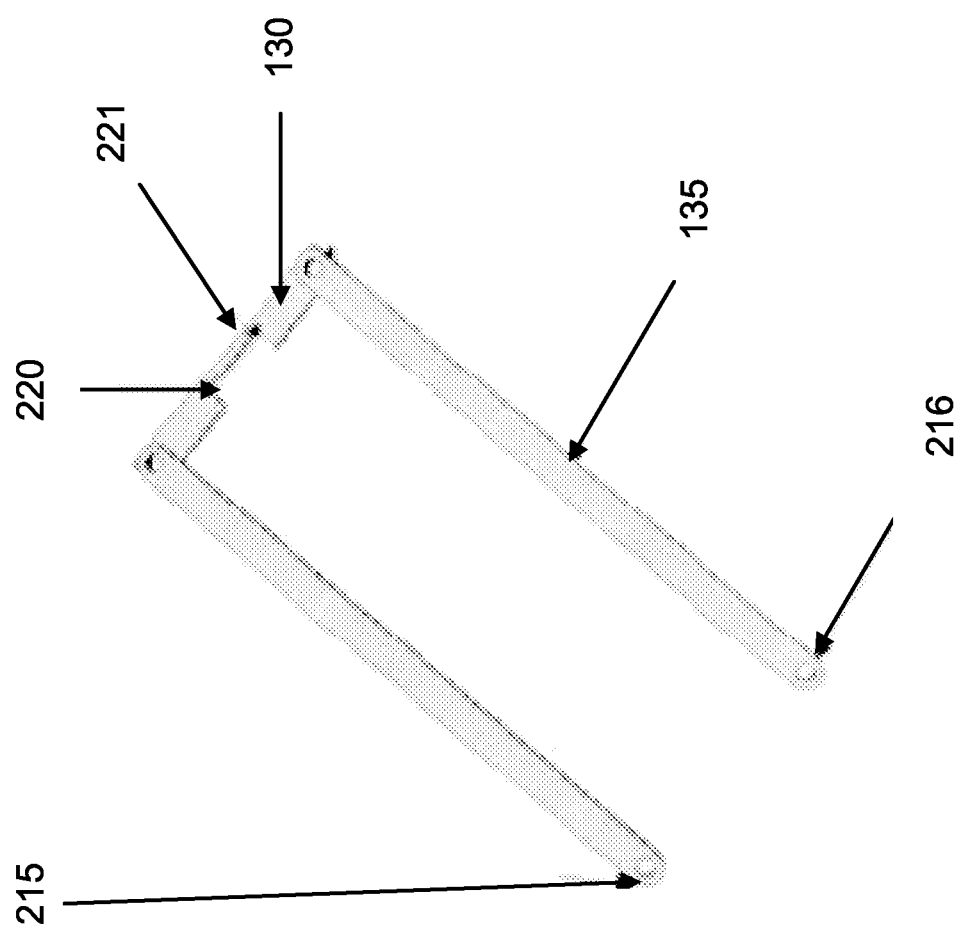
FIG. 10 illustrates the control arm and a tie arm in accordance with the present disclosure.

FIGS. 9 and 10 illustrate the control arm assembly including the control arms 135 and the tie arm 130. To facilitate this repetitive traversing action, the control pin 210 may be capable of swinging from one control point (arm) to another. The two control arms 135 (left and right) may be hinged at their ends (e.g., at control arm centers 215 and 216) located on the stanchion 150. A tie arm 130, equivalent to the distance between the two centers of rotation 215 and 216 of the two control arms 135, connects the two control arms 135. The centers of rotation 215 and 216 may mirror each other, and may be located downstream of the center of rotation of the upper power arm 160. The control pin 210 is disposed on the upstream side of the tie arm 130 and is capable of swinging from one control point to another (e.g., control points 220 and 221) on the tie arm 130. Each control point (e.g., control point 220 or 221) on the tie arm 130 may require shoulders to hold the control pin 210 in position for that leg of the traverse. This means the tie arm 130 may need to be longer than the theoretical distance between the control arm centers 215 and 216. Once the length of the tie arm 130 is determined, the control arm centers 215 and 216 may be adjusted accordingly. This design creates an oscillating parallelogram where the control pin 210 may move between control points 220 and 221 on the tie arm 130. Providing the limited movement of the control pin 210 across the tie arm 130 facilitates the hull 105 to change directions while maintaining the specified angles of attack profile.

Flywheel and Push Arm

In various embodiments, the relatively linear motion of the hull 105 may be converted to rotational motion to operate a conventional generator for generating electricity. For example, as shown in FIG. 1, the upper power arm 160 may be connected to a flywheel 145 through a push arm 140. As shown in FIG. 6, the upper power arm 160 may have a push arm extension 175 to connect the push arm 140. The location of the flywheel 145 may dictate the angle at which the push arm 140 is attached to the push arm hinge pin 180. The diameter of the flywheel 145 may be dictated by the swing of the push arm extension 175. The push arm 140 may be attached to the push arm extension 175 through the push arm hinge pin 180. The other end of the push arm 140 may be connected to the flywheel 145 through a pin hinge. The flywheel 145 and push arm 140 may convert the oscillating motion of the upper power arm 160 into a rotational motion of the flywheel 145. In further embodiments, gears and a transmission may convert the slow powerful rotation of the flywheel 145 up to a higher rotational speed to drive an electricity generator.

In some embodiments, the push arm 140 may be replaced with a hydraulic system to transmit the energy from the upper power arm 160 to the flywheel 145 or a crank shaft. This system may include hydraulic pistons located at the push arm extension 175 and/or the flywheel 145. The pistons may be connected by a hydraulic line. The hydraulic fluid may transmit the movement of the upper power arm 160 into the movement of the flywheel 145. This change to the system may provide greater flexibility in the systems layout. The flywheel 145 may be remotely located and sized independent of the dimensions of the power arm assembly 125. Replacing the push arm 140 with a hydraulic system provides greater design flexibility.

Figure 11A:
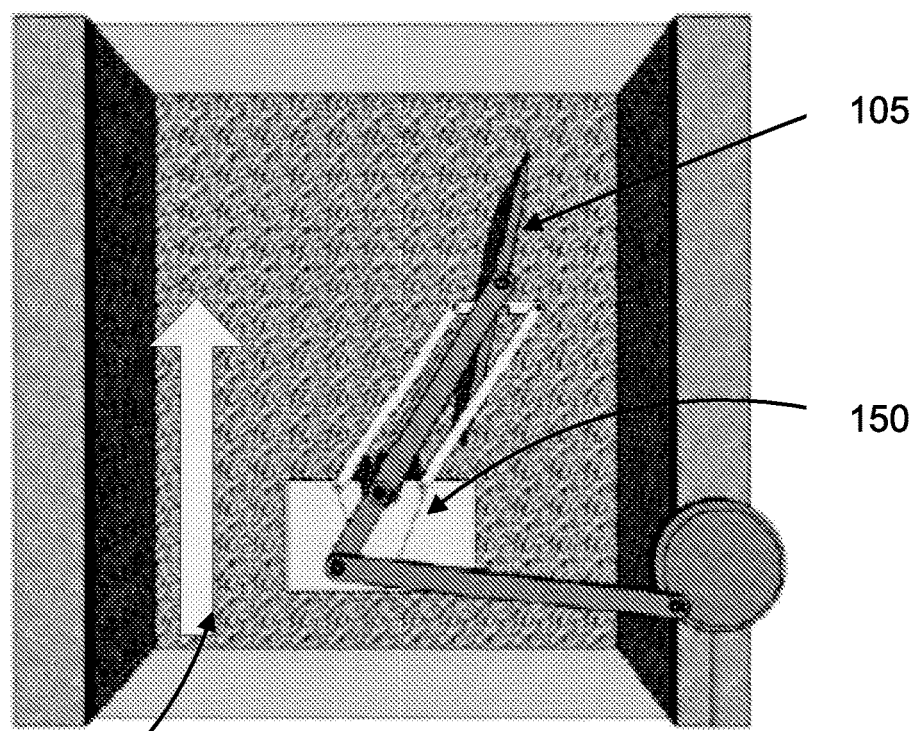
FIG. 11A illustrates movement of the hydrokinetic power source in accordance with the present disclosure.
Figure 11B:
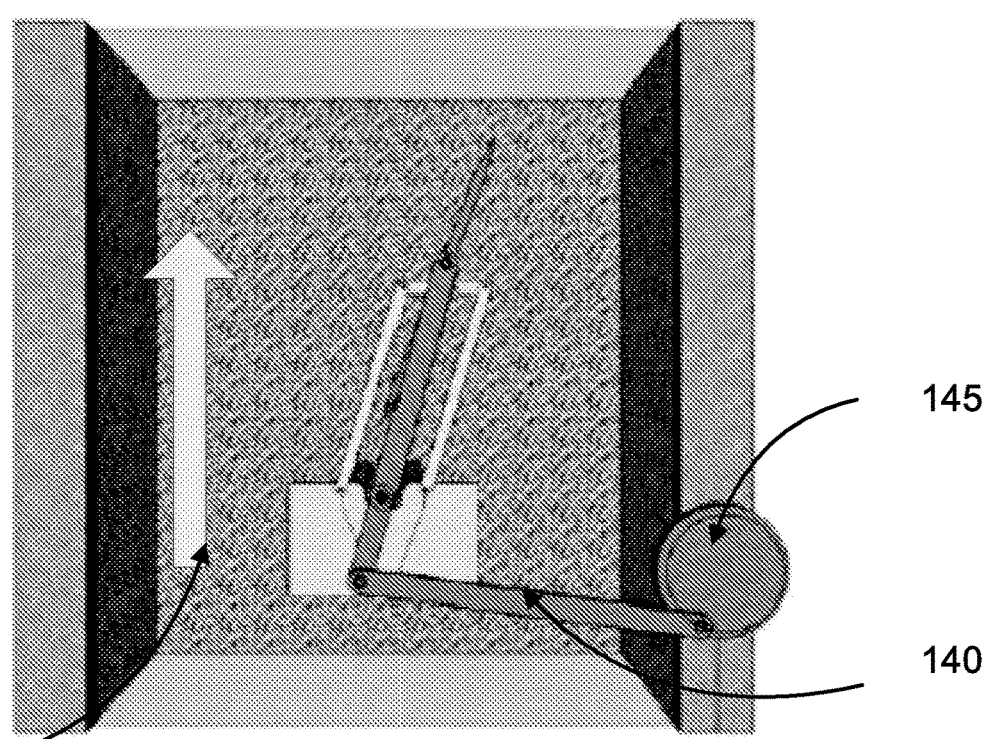
FIG. 11B illustrates movement of the hydrokinetic power source in accordance with the present disclosure.
Figure 12A:
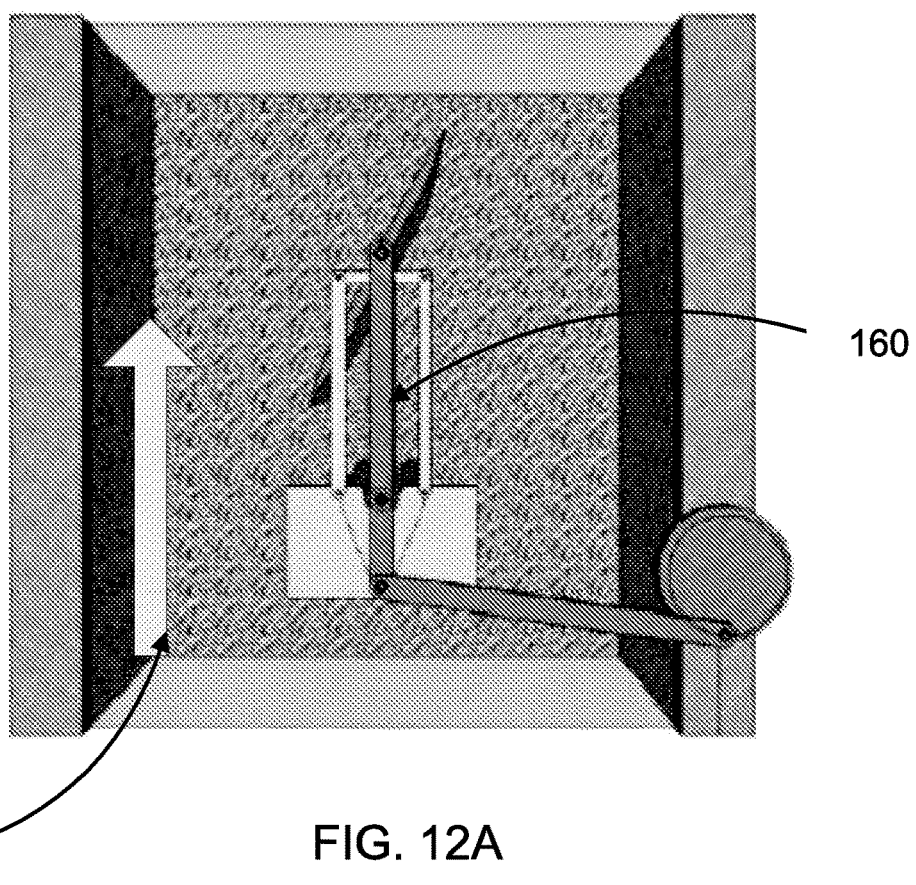
FIG. 12A illustrates movement of the hydrokinetic power source in accordance with the present disclosure.
Figure 12B:
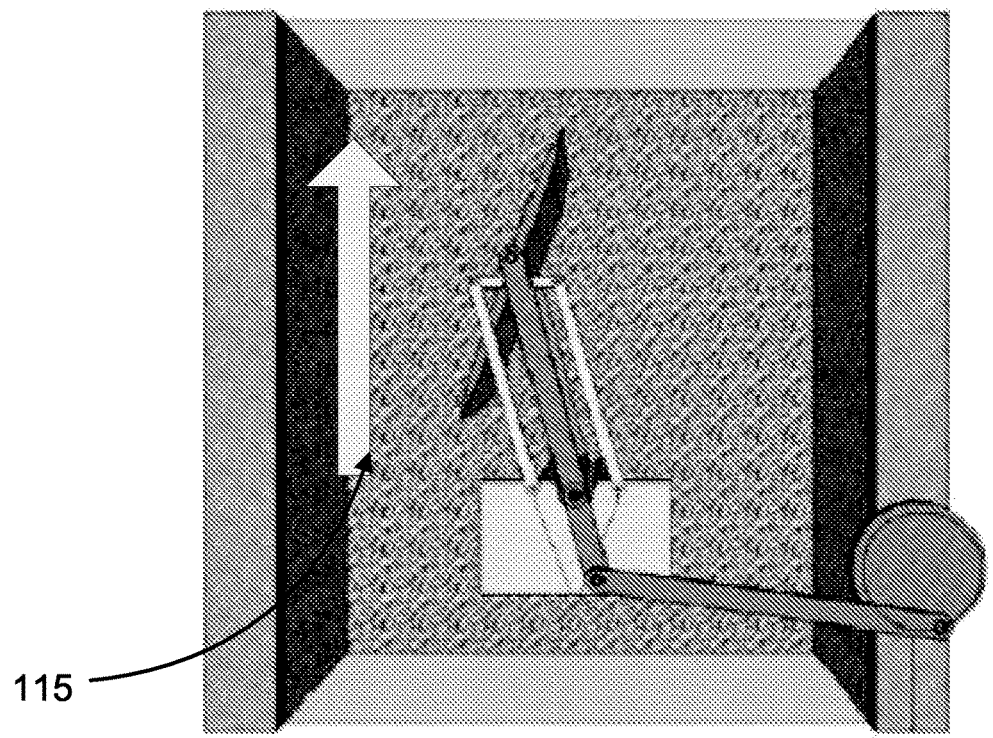
FIG. 12B illustrates movement of the hydrokinetic power source in accordance with the present disclosure.
Figure 13A:
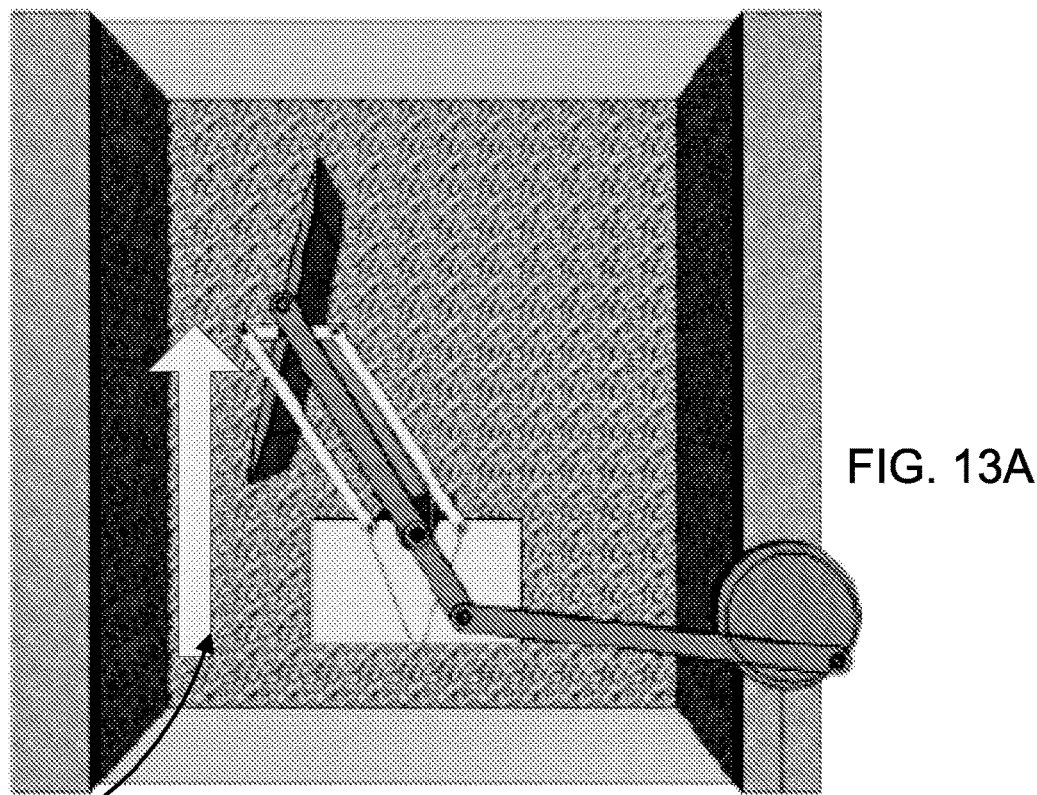
FIG. 13A illustrates movement of the hydrokinetic power source in accordance with the present disclosure.
Figure 13B:
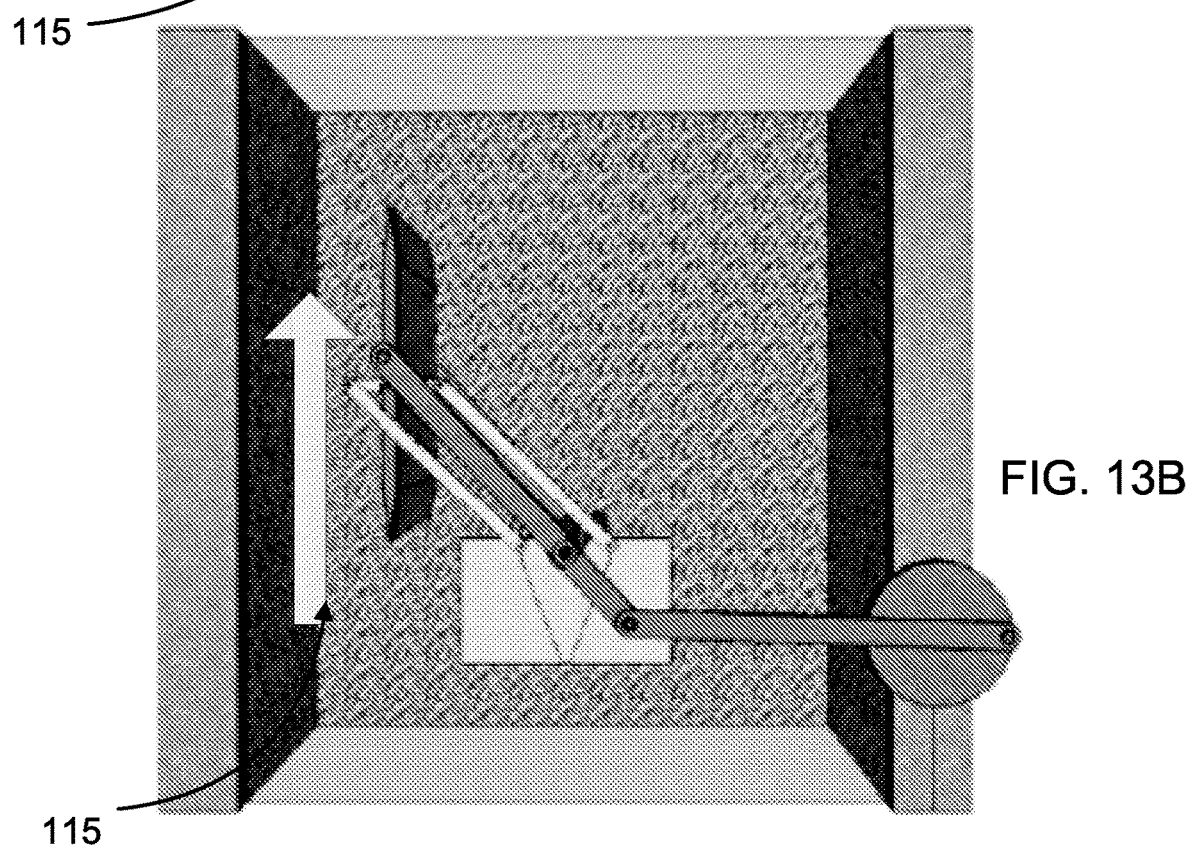
FIG. 13B illustrates movement of the hydrokinetic power source in accordance with the present disclosure.

FIGS. 11A-13B illustrate the movement of the hydrokinetic power source 100 in the counterclockwise rotation. From the time the hull 105 initiates that direction of rotation to the time it is parallel to the current 115 at the end of swing. In the example shown in FIGS. 11A-13B, the hull 105 swings from one side of the stanchion 150 to another side (e.g., from right river bank to left river bank). In FIG. 11A, the hull 105 starts at the right side of the stanchion 150 with a non-zero angle of attack relative to the current 115 such that the leading edge of the hull 105 points to the left river bank. Because of the non-zero angle of attack, the current 115 pushes on the surface area of the hull 105 that faces the current 115, thereby pushing the hull 105 to swing left. The hull 105 moves left toward the center of the current, as shown in FIG. 11B. As shown in FIG. 12A, when the upper power arm 160 is at the center of the current 115, i.e., when the upper power arm 160 is in parallel with the flow direction of the current 115, the hull 105 remains a non-zero angle of attack relative to the current 115. Thus, the current 115 continues to push the hull 105 to left, causing the upper power arm 160 to continue swing left, as shown in FIG. 12B. As shown in FIG. 13A, the hull 105 is pushed to the leftmost location. The angle of attack of the hull 105 may then be adjusted, manually or automatically, through the control arm 135, such that the leading edge of the hull 105 points to the right side of the river bank. FIGS. 13A and 13B show that the hull 105 is rotated from the angle of attack in FIG. 13A (leading edge pointing to left river bank) to a position where the leading edge of the hull 105 points to the reverse direction of the current 115. Further rotating the hull 105 from the position shown in FIG. 13B counterclockwise will cause the leading edge of the hull 105 to point to the right river bank. Starting at this position, the hull 105 may be pushed by the current 115 back to the right river bank, e.g., to its original position shown in FIG. 11A, and the swing from the position shown in FIG. 11A will repeat. The back and forth (i.e., left and right) swing motion of the hull 105 causes the upper power arm 160 to rotate, which in turn causes the push arm 140 to rotate. The rotating push arm 140 causes the flywheel 145 to rotate. The rotation mechanical energy of the flywheel 145 can be converted into electricity through an electricity generator connected with the flywheel 145.

End of Swing Transition

A transition or control mechanism may move the control pin 210 from the outside control point (one of the control points 220 and 221) to the inside control point (the other one of the control points 220 and 221) or vice versa when the upper power arm 160 is reaching the end of its swing, as shown in FIG. 3. If no transition mechanism is provided, the hull 105, the upper power arm 160, and control arm 135 may bind once the hull 105 is in parallel with the current 115. This binding can prevent the hull 105 from swinging to the opposite control point (e.g., one of the control points 220 and 221), which may be required to start the reverse traverse of the current 115. There are multiple solutions to the issue from a simple mechanical approach to a more sophisticated system and electronic controls. More sophisticated controls have greater capacity to provide a smoother transition and end of swing motion.

Various embodiments may utilize a simple transition cable. The object of the transition cable is to stop the control pin 210 at the point the hull 105 is in parallel with the current 115 on the inside control point (e.g., one of the control points 220 and 221). Stopping the control pin 210 may not automatically advance the tie arm 130 so the control pin 210 may be at the inside control point (e.g., one of the control points 220 and 221). To simultaneously stop the control pin 210 and advance the tie arm 130, the transition cable may be looped around the control pin 210 and attached to the end of the tie arm 130. As tension is developed in the transition cable, it may exert a force on both the control pin 210 and tie arm 130 to start advancing the tie arm 130. The tie arm 130 may be advanced until the control pin 210 is at the new inside control point (e.g., one of the control points 220 and 210) and the hull 105 is in parallel with the current 115. Further movement of the upper power arm 160 may transition the angle of attack back towards the center of the current 115. The hydrostatic pressure force on the hull 105 may keep the control pin 210 at the new inside control point (e.g., one of the control points 220 and 221). As the hull 105 begins to traverse the current 115, the transition cable may go slack. A second, mirrored, transition cable may reverse the course of the hull 105 once it reaches the other side of the current 115 (e.g., the other side of the river bank). Further embodiments may incorporate a slack control system to keep the transition cables from dragging in the water and possible tangle and derailment.

Idling (Stopping)

The hydrokinetic power source 100 may be idled for maintenance without interrupting the flow of the current 115. If the bow of the hull 105 is secured behind the stanchion 150, the current 115 may maintain the hull 105 in parallel with the current 115 and behind the stanchion 150, like pulling a canoe with a bow leader. The end of swing transition system may also be used by centering the control pin 210 on the tie arm 130. This centering may make the hull 105 stable and naturally align downstream of the stanchion 150. Consideration must be given to the end of swing transition system, since the control pin 210 does not rest on the tie arm 130, only the shoulders or cables of the transition system. The current design makes it relatively easy to idle the hydrokinetic power source 100 for inspections and maintenance.

Dynamic Angle of Attack Control

In various embodiments, more precise control of the angle of attack of the hull 105 may be accomplished by providing dynamic control through an adjustable single control arm 136 (shown in FIG. 14) and a control system 195. In some embodiments, the length of the adjustable single control arm 136 may be adjusted. The control system 195 may be a digital control system implementing digital controls, an analog control system implementing analog controls, or a digital and analog control system implementing both digital controls and analog controls. The control system 195 may include hardware components, such as circuits, chips, computer processors, non-transient computer memories, electrical motors, servos, etc. The control system 195 may also include software components, such as computer codes, instructions, programs, etc. The software components may be encoded on non-transient computer-readable media, such as, for example, a Compact Disc (CD), a Digital Video Disc (DVD) or Digital Versatile Disc (DVD), a Blu-Ray Disc, a hard drive, a flash memory drive, a Read Only Memory (ROM), a Random Access Memory (RAM), etc. In addition to controlling the adjustable single control arm 136, the control system 195 may also control other components or devices of the hydrokinetic power source 100, such as, for example, the control arms 135, the power arm assembly 125, the flywheel 145, the tie arm 130, etc. In one embodiment, the control system 195 may be configured to implement the various controls disclosed herein.

Figure 14:
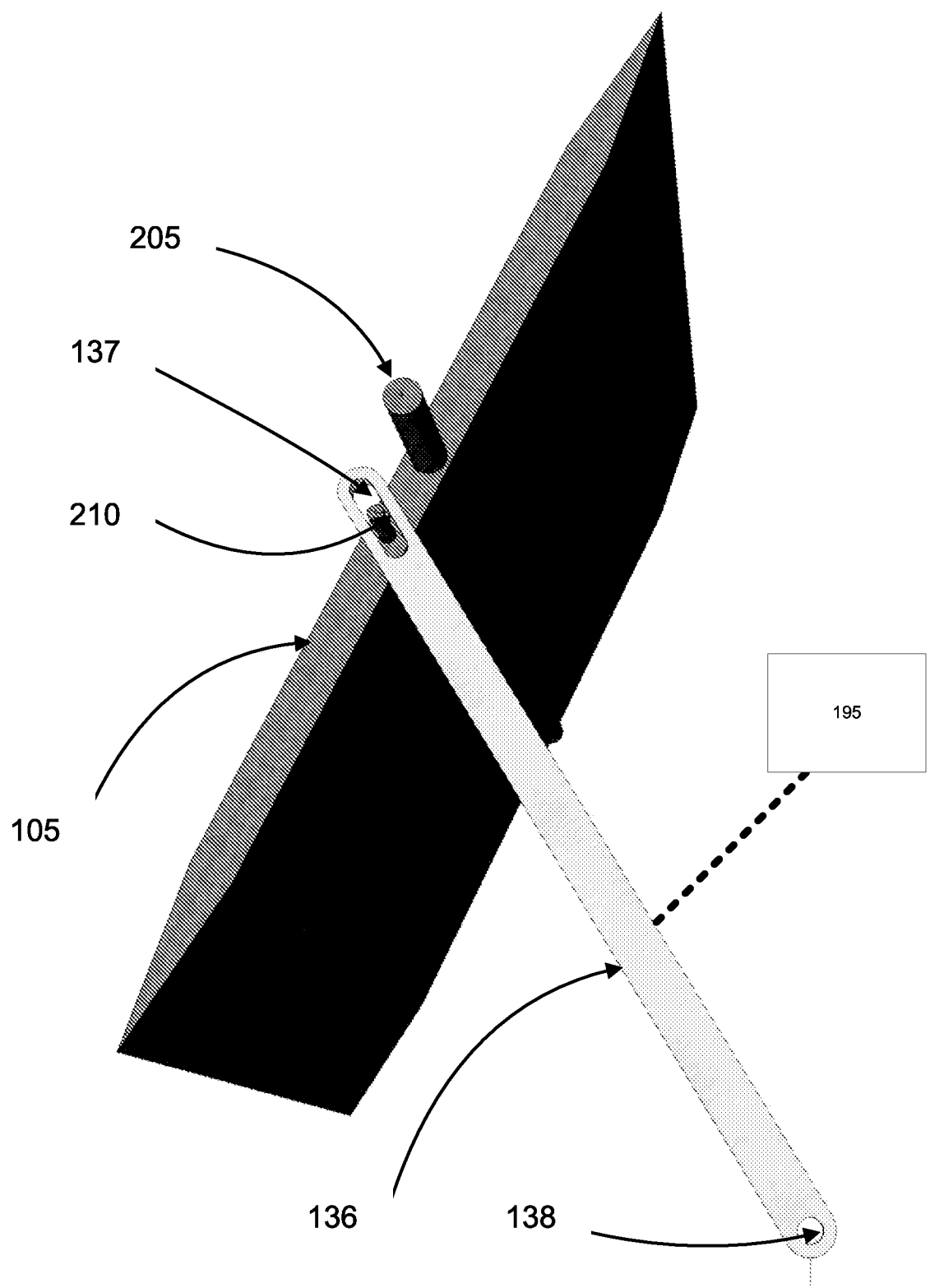
FIG. 14 illustrates an adjustable single control arm and a control system in accordance with the present disclosure.
Figure 15:
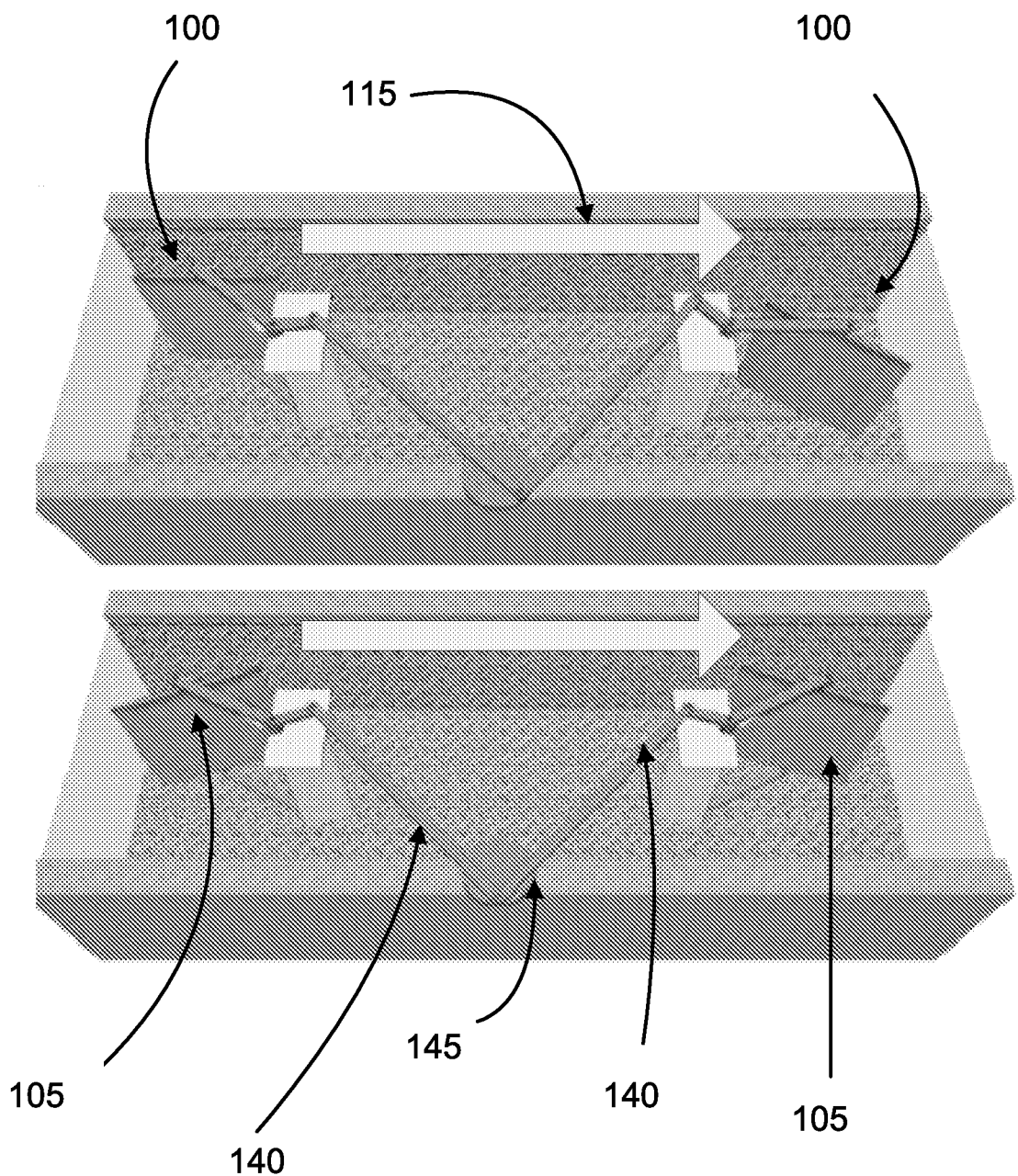
FIG. 15 illustrates a system having two hydrokinetic power sources connected with a single flywheel in accordance with the present disclosure.
Figure 16:
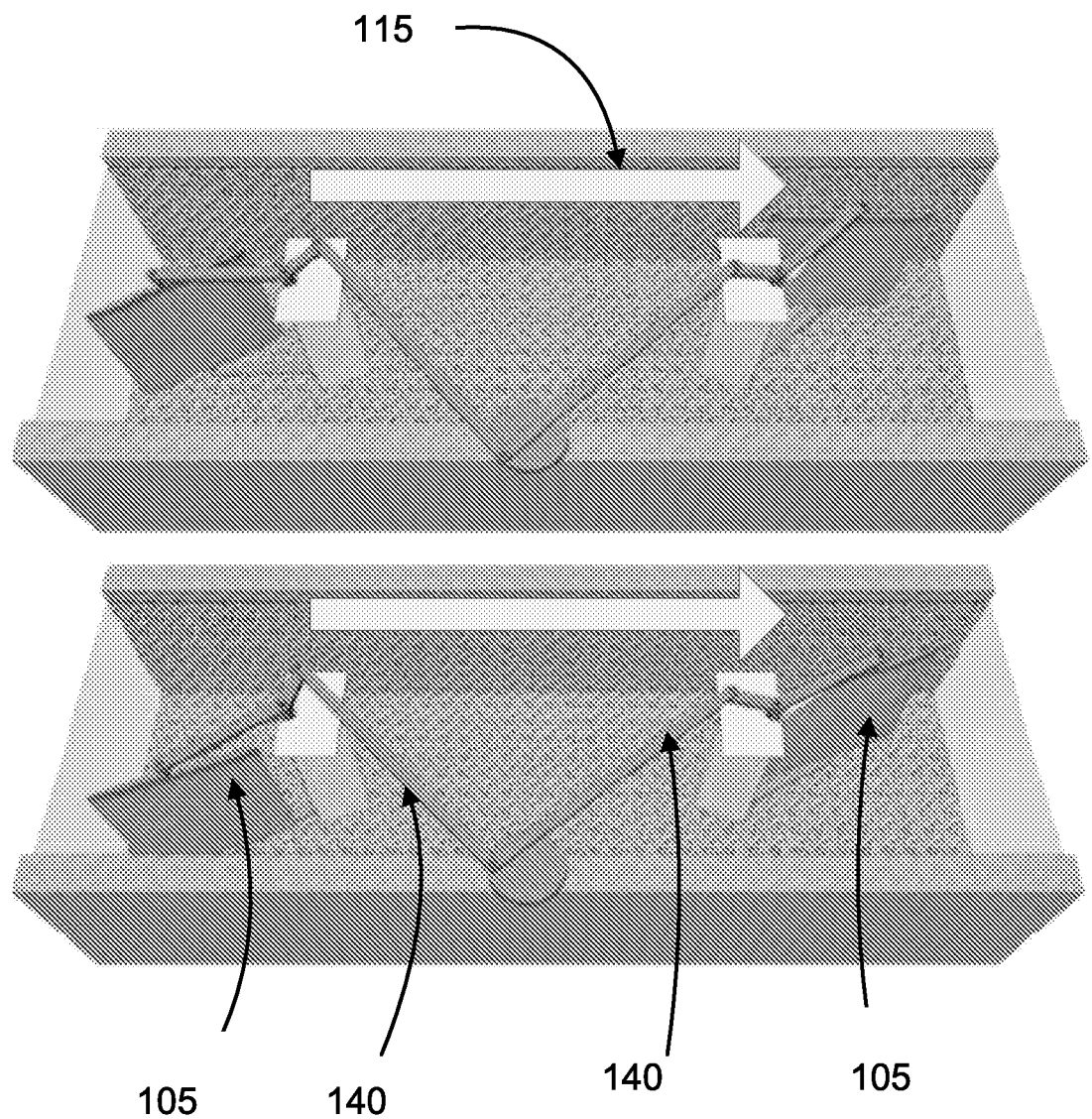
FIG. 16 illustrates movement of the system having two hydrokinetic power sources connected with a single flywheel in accordance with the present disclosure.
Figure 17:
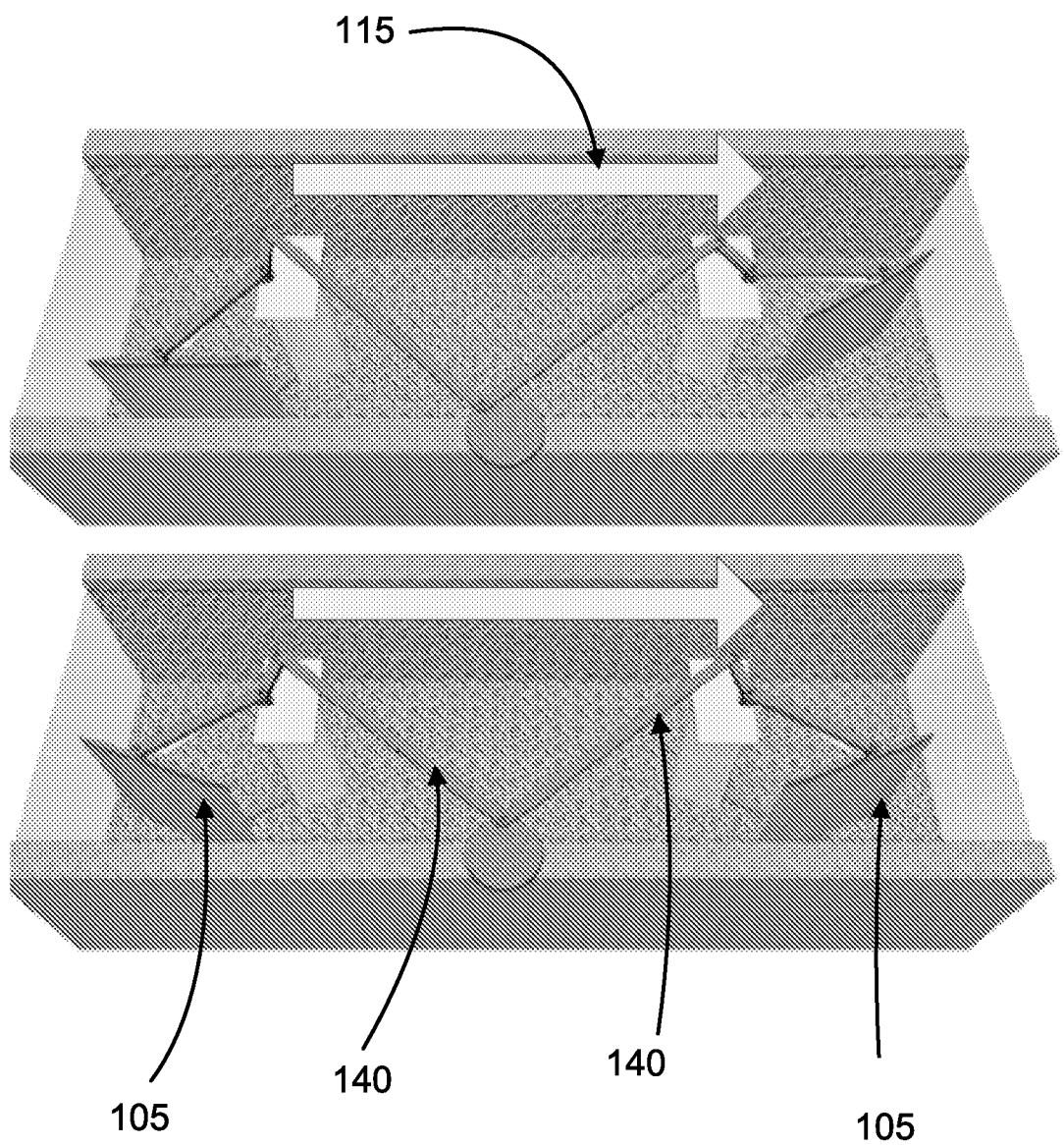
FIG. 17 illustrates movement of the system having two hydrokinetic power sources connected with a single flywheel in accordance with the present disclosure.
Figure 18:
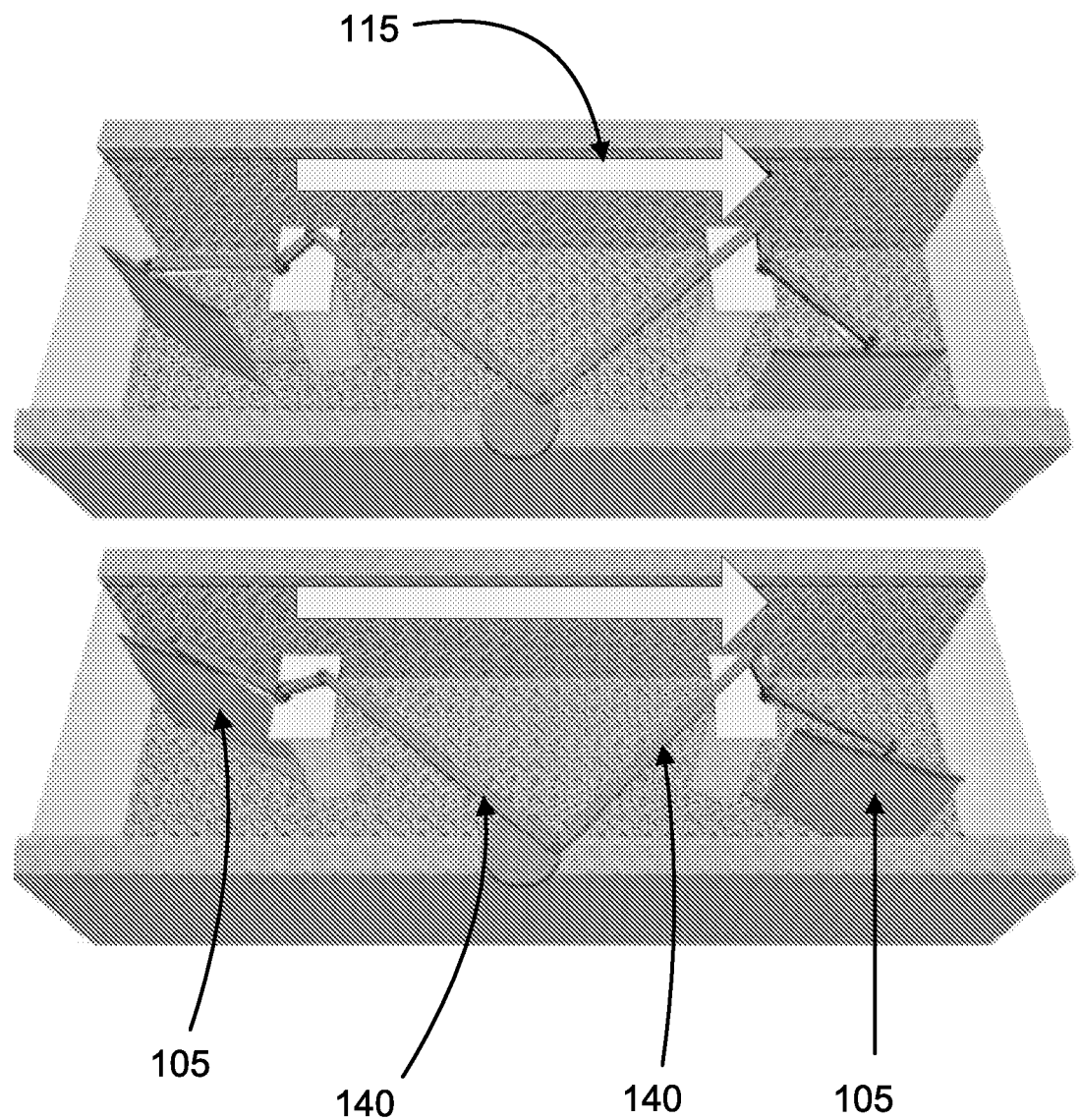
FIG. 18 illustrates movement of the system having two hydrokinetic power sources connected with a single flywheel in accordance with the present disclosure.

FIG. 14 shows a schematic of an example of the adjustable single control arm 136. For example, the adjustable single control arm 136 may include a slot 137 to accommodate and allow control pin 210 to move to different control points. It is understood that the slot 137 may include structures for defining different control point positions, which are not shown in FIG. 14. The control system 195 may control the adjustable single control arm 136 to change the contact position of the control pin 210 with the adjustable single control arm 136 (e.g., with the slot 137). As the hull 105 moves across the current 115, the point of interaction between the control pin 210 and the adjustable single control arm 136 may be adjusted to provide the desired hull motion. The adjustable single control arm 136 may include a center of rotation (or pivot point) 138, which may be located at the center of the upper control arm 160 in the direction of flow. The adjustable single control arm 136 may be controlled by the control system 195 to establish the desired angle of attack at each point of swing of the upper power arm 160. The distance between the pivot point of the adjustable single control arm 136 and control point (e.g., control point 220 or 221) may be adjusted by the control system 195 based on at least one of the position (e.g., angular position) of the upper power arm 160 and direction of swing of the upper power arm 160. The control system 195 may detect the position of the upper power arm 160 and the direction of swing of the upper power arm 160, or the position of the flywheel 145. Based on at least one of the position of the upper power arm 160, the direction of swing of the upper power arm 160, or the position of the flywheel 145, the control system 195 may control a mechanical system (not shown, which may include an electrical motor) to move the control point 220 or 221 to a specified location. The pivot point 138 of the adjustable single control arm 136 may be located downstream of the pivot point of the upper power arm 160 and on the same center of current. The distance between the pivot points may be minimized or close to the same offset of the two control arm approach shown in, e.g., FIG. 1 and FIGS. 9-13. The limiting factor may be the structural support of the adjustable single control arm 136 in close proximity to the pivot point of the upper power arm 160. Once the desired separation is established, the control pin 210 of the hull 105 may be located to minimize the required travel of the control point 220 or 221 of the adjustable single control arm 136.

Idling the hydrokinetic power source 100 may be accomplished with dynamic angle of attack controls. The control system 195 may have one or more preset idling positions. As the hull 105 reaches the idling position, the control point 220 or 221 of the adjustable single control arm 136 may be adjusted to the corresponding idling length. To restart the hydrokinetic power source 100, the control system 195 may identify the point of rotation on the flywheel 145 and slowly adjust the position of the control point 220 or 221 of the adjustable single control arm 136 to re-establish the angle of attack profile. The dynamic angle of attack control, as achieved by the control system 195, allows service personnel to idle the hydrokinetic power source 100 before approaching the hydrokinetic power source 100 and to be clear of the hydrokinetic power source 100 before restarting it.

Maximum Angle of Attack

In further embodiments, the hydrokinetic power source 100 may be customized to the current 115 it seeks to extract energy from. The design variables may include determining the maximum angle of attack. This is anticipated to have an inverse relationship with the maximum anticipated current velocity; slower currents may be associated with greater angles of attack where swifter current may be associated with lower angles of attack. Different embodiments may rely on different types of current 115, speeds of the current 115, and maximum angle of attack. The hydrokinetic power source 100 may be customized for its installation by determining the optimal maximum angle of attack, which will dictate the centers of rotation of the control arms.

Tidal Installations

In various embodiments, the hydrokinetic power source 100 may be adjusted for tidal installations where power can be generated when the current flows in either direction. A tidal hydrokinetic power source 100 may include the upper power arm 160 and lower power arm 165 hinged to the hull 105 in the geometric center (or center of force) of the hull 105. A movable control surface may be incorporated into the hull 105. By moving the control surface it may increase the surface area of the hull 105 on the upstream side of the hull 105. When the current 115 changes direction, the control surface may be changed to increase the surface area of the hull 105 on the new upstream side of the hull 105. By building movable control surfaces into the hull 105, the hydrokinetic power source 100 may extract energy from tidal currents or currents that change their direction of flow.

In various embodiments, implementation of the dynamic angle of attack control system may eliminate the need for control surfaces on the hull 105. This embodiment may not rely on the current 115 to hold the control pin 210 at one of two control points 220 or 221 on the tie arm 130. A specific control location may be established for every point of rotation of the flywheel 145. The control points 220 or 221 may also be adjusted based on the direction of flow of the current 115.

Connecting Multiple Hydrokinetic Power Sources

Multiple hydrokinetic power sources 100 may be connected to a single flywheel 145 or more than one flywheel 145 and one or more electricity generator. Connecting multiple hydrokinetic power sources 100 increases the power and torque delivered to the flywheel 145 and the electricity generator. This allows large installations to take advantage of economies of scale by using fewer and larger generators. For example, four or more hydrokinetic power sources 100 may be connected to a single flywheel 145. By strategically offsetting the angles, such as by 90 degrees, the system can provide a more uniform force/torque through the rotation of the flywheel 145. Connecting multiple units provides a smoother operating machine with more consistent power input to the generator.

In some embodiments, the push arm 140 may incorporate (e.g., include) a hydraulic system or may be replaced by a hydraulic system. The hydraulic system may provide greater flexibility when connecting multiple hydrokinetic power sources 100 to a single flywheel (e.g., flywheel 145) or crank shaft. FIGS. 15-18 illustrate an example system in which multiple hydrokinetic power sources 100 are connected to a single flywheel 145 via push arms 140. At least one of the push arms 140 may include a hydraulic system or may be replaced by a hydraulic system. For illustrative purposes, the example system shown in FIGS. 15-18 includes two hydrokinetic power sources 100. It is understood that more than two hydrokinetic power sources 100 may be connected to a single flywheel 145 or more than one flywheel 145. FIGS. 15-18 show the movement of the system including two hydrokinetic power sources 100, such as the swing of the hulls 105 in each hydrokinetic power source 100.

Design of Hull and Power Generation

Existing advanced systems, such as wind and current turbines, are not generating a large quantity of power. It appears the design approaches for these devices follow the conventional wisdom of aeronautics and naval architecture. This conventional wisdom strives to minimize drag and surface area while maximizing lift.

In naval architecture and aeronautics the formulas for lift and drag force consist, in part, of the associated coefficient times the area of the air/hydro foil. The coefficients of lift and drag are unit-less values. If both sides of the equations are divided by area, then the force per square foot is directly correlated with the respective coefficient. Maximizing the lift force per square foot, or the coefficient of lift (Cl), minimizes the required area of the air/hydro foil to generate the desired lift force. In naval architectures, minimizing the size of the rudder or other control surface reduces material costs and the weight. Minimizing the required air foil area is critical in controlling the weight of aircrafts. Plotting the coefficient of lift is the standard convention in both aeronautics and naval architecture to facilitate the design of air craft and naval control surfaces. An example of the plot showing the coefficient of lift versus the angle of attack and the different aspect ratios is shown in FIG. 19.

Naval architecture and aeronautics strives to minimize drag. The crafts power plant must overcome all of the drag forces of the craft. Minimizing the drag force per square foot, or the coefficient of drag (Cd), minimizes the impact the air/hydro foil has on the crafts power plant and/or performance. This is the same as maximizing the inverse of the drag coefficient.

It is standard convention in both aeronautics and naval architecture to plot the coefficients of lift and drag for air and hydrofoils. The key aspect of the design is trying to maximize the lift force while minimizing the drag force. The imperial data on the air/hydrofoil typically includes a plot of the ratio of lift coefficient divided by drag coefficient, or the lift to drag ratio. In naval architecture and aeronautics the optimal performance point is where the greatest relative lift is generated for a given quantity of drag per square foot of air/hydrofoil is maximized, or the maximum lift to drag ratio.

The lift to drag ratio typically increases with an increasing aspect ratio. This value typically maxes out at a relatively low angle of attack. In FIG. 19, the maximum lift to drag ratio is at 5 degrees of angle of attack and an aspect ratio of 6.0. The aspect ratio shown in FIG. 19 is defined as the air foil's span (Length Normal to flow) divided by its cord (Depth in Direction of flow) (S/C). Air foils with high aspect ratios are long and slender like the blades on a propeller. The design of wind and hydro turbines appear to try and maximize their impellers' lift to drag ratio because they tend to be long and slender.

What is the optimal aspect ratio for extracting energy from a flowing fluid? In craft design, drag impacts the size and weight of the power plant, which in turn drives the size, weight, and performance of the craft. For a stationary fluid generator, drag impacts the size and first cost of the generators structural base. It will also impact the service and maintenance of the equipment due to forces on moving components. But it is not the primary diver of the performance of a stationary fluid generator. Drag does not have as significant of an impact on a stationary generator as it has on a ship or plane.

The primary goal of a stationary fluid generator is to generate power. This requires the designer to maximize the lift force of the hydrofoil. For a given fluid current the fluid density and velocity will be constants. System design can only impact the coefficient of lift and area of the air/hydro foil. The inventor evaluated these factors per unit of span, normal to flow into the sheet of a two dimensional (2D) section. The aspect ratio is the air/hydro foil's span divided by its cord. Holding the span constant, the aspect ratio will decrease as the cord increases. Correspondingly, the foil's area will increase as the aspect ratio decreases. For a given angle of attack, the air/hydro foil's area will increase as the coefficient of lift decreases with a decreasing aspect ratio.

Figure 20:
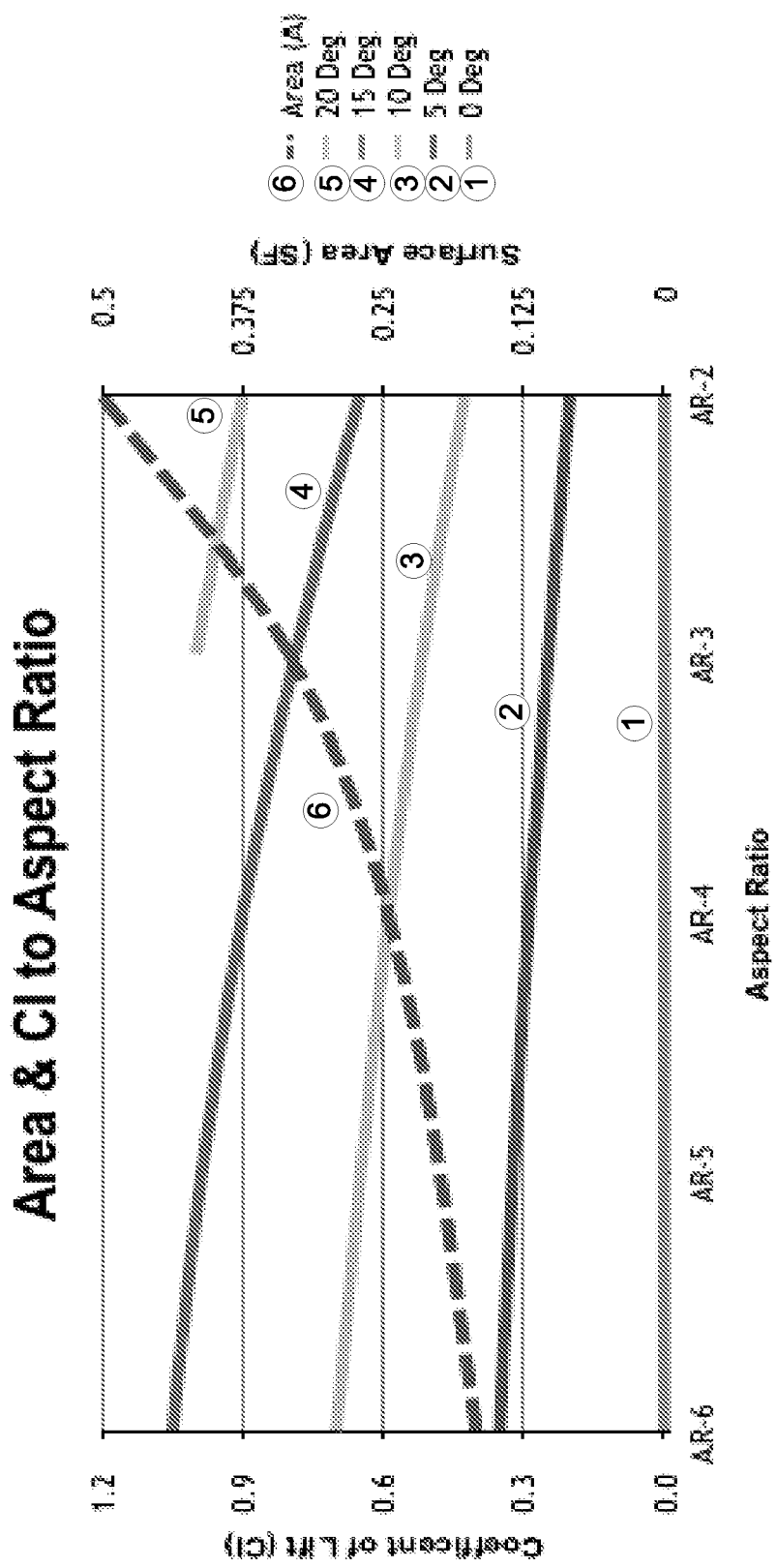
FIG. 20 illustrates a relationship between the surface area of the hull, the coefficient of lift, the angle of attack, and the aspect ratio in accordance with the present disclosure.

FIG. 20 shows the relationship between the coefficient of lift (CL), surface area, aspect ratio, and the angle of attack. As shown in FIG. 20, for a given aspect ratio (e.g., AR=2.0), the coefficient of lift increases as the angle of attack increases. For a given angle of attack except 0 degrees (e.g., 5 degrees), the coefficient of lift decreases as the aspect ratio decreases (e.g., from AR=6.0 to AR=2.0).

Figure 21:
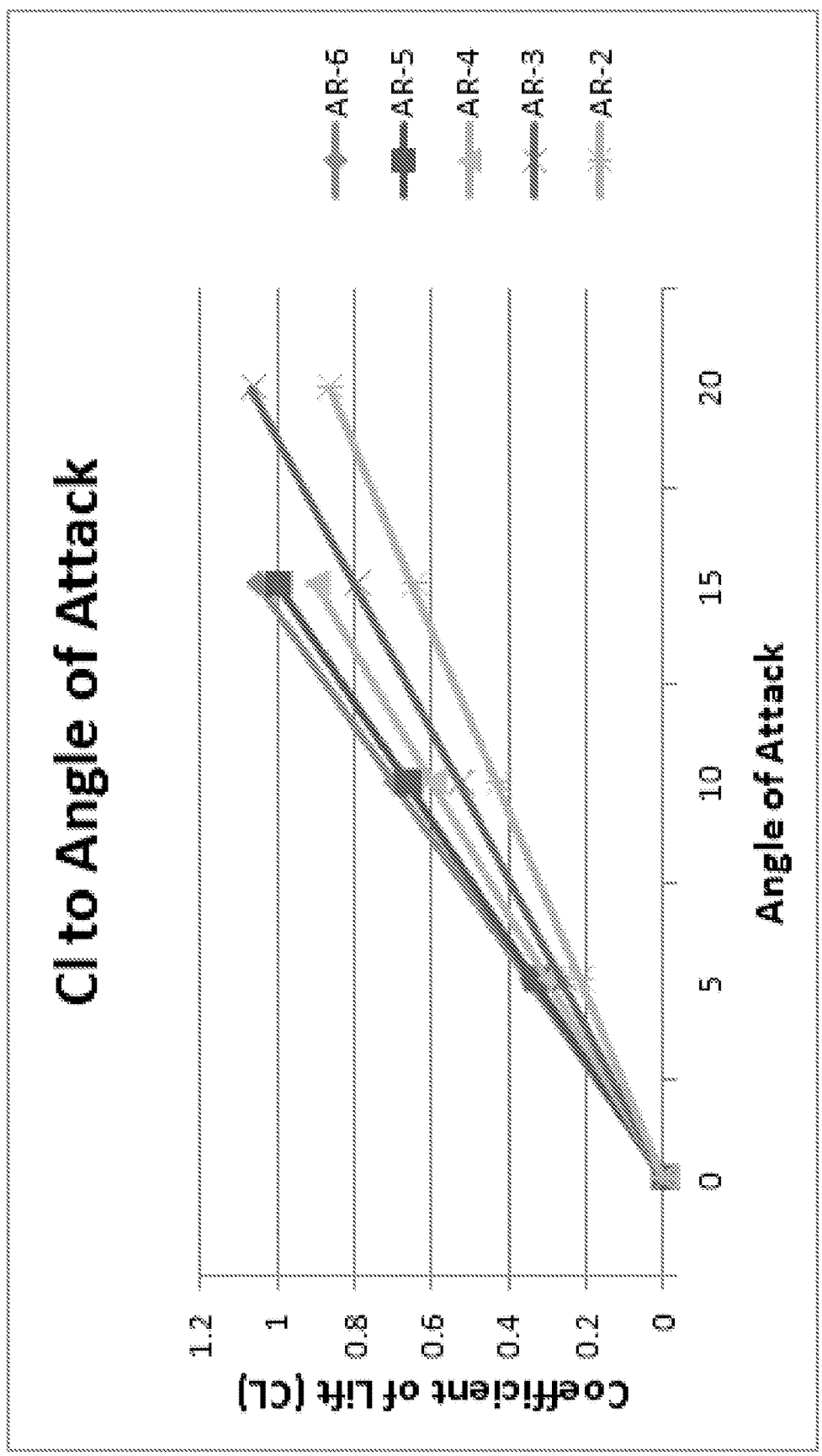
FIG. 21 illustrates a relationship between the coefficient of lift, the angle of attack, and the aspect ratio in accordance with the present disclosure.

FIG. 21 shows the relationship between the coefficient of lift, angle of attack, and aspect ratio, with the aspect ratio ranging from AR=2.0 to AR=6.0. As shown in FIG. 21, for a given angle of attack, the coefficient of lift decreases as the aspect ratio decreases. For a given aspect ratio, the coefficient of lift increases as the angle of attack increases.

Figure 22:
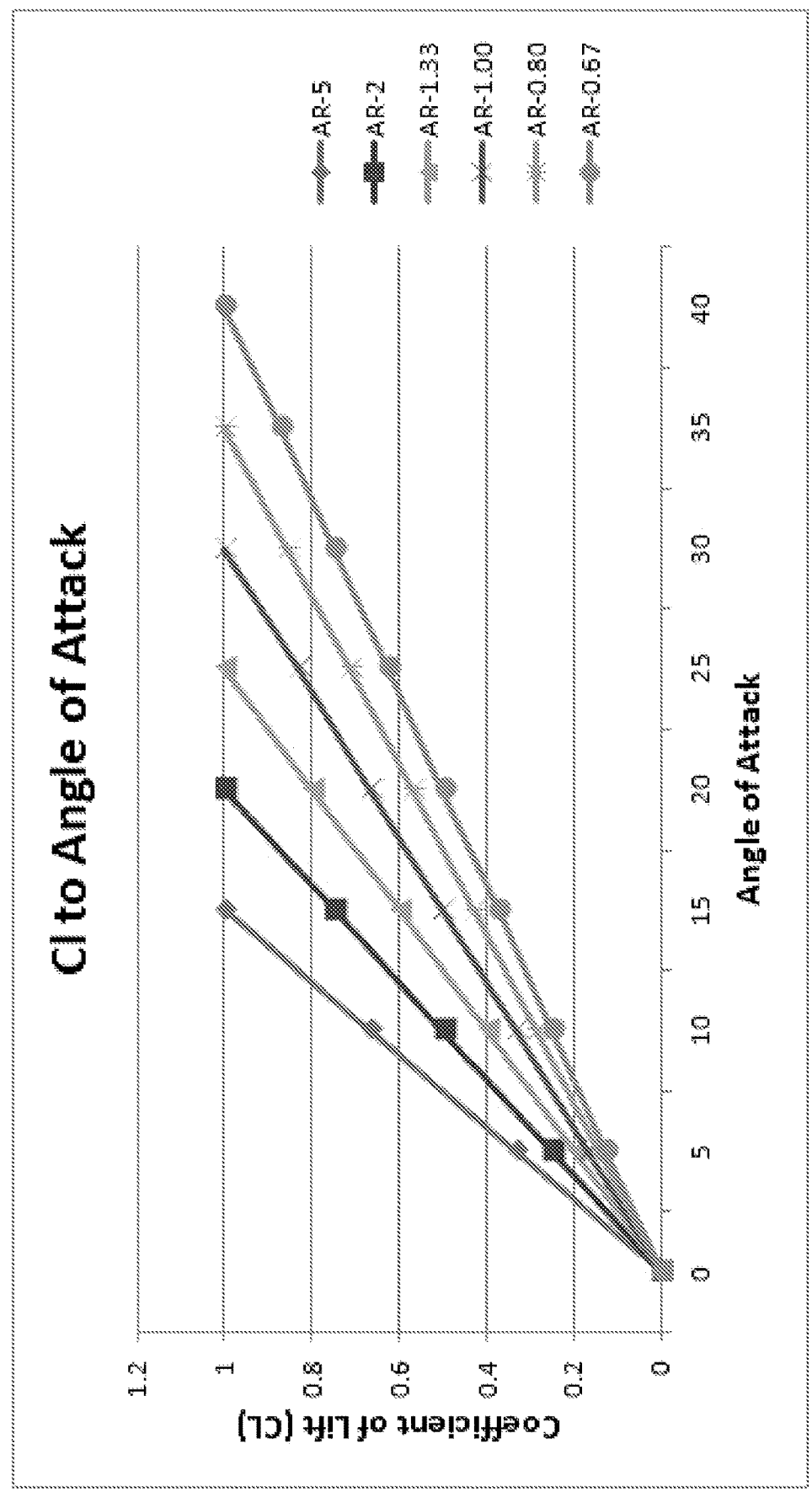
FIG. 22 illustrates a relationship between the coefficient of lift, the angle of attack, and the aspect ratio in accordance with the present disclosure.

FIG. 22 shows the relationship between the coefficient of lift, angle of attack, and aspect ratio, with the aspect ratio ranging from AR=0.67 to AR=5.0. As shown in FIG. 22, for a given angle of attack, the coefficient of lift decreases as the aspect ratio decreases. For a given aspect ratio, the coefficient of lift increases as the angle of attack increases.

Figure 23:
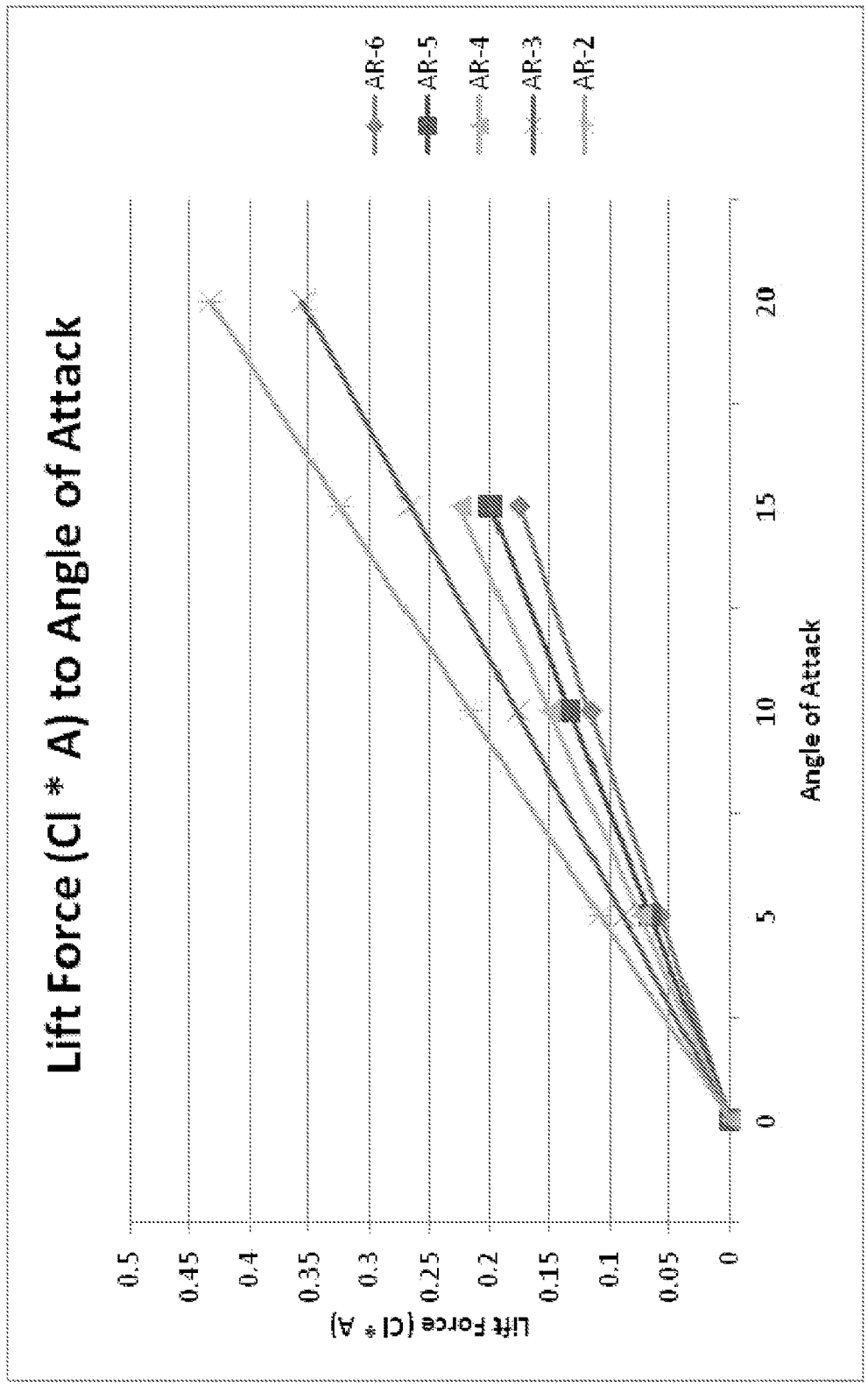
FIG. 23 illustrates a relationship between the lift force, the angle of attack, and the aspect ratio in accordance with the present disclosure.

FIG. 23 shows the relationship between the lift force, angle of attack, and aspect ratio, with the aspect ratio ranging from AR=2.0 to AR=6.0. The lift force is the product of the coefficient of lift and the surface area. As shown in FIG. 23, with a constant angle of attack (e.g., 10 degrees), the lift force increases with a decreasing aspect ratio (e.g., aspect ratio decreasing from AR=6.0 to AR=2.0). Increasing angles of attack increases the product of the two components. For a given aspect ratio (e.g., AR=2.0), the lift force increases with increasing angles of attack. The greatest lift force is generated at lower aspect ratios and greater angle of attack (e.g., AR=2.0 and angle of attack=20 degrees in the example shown in FIG. 23).

Figure 24:
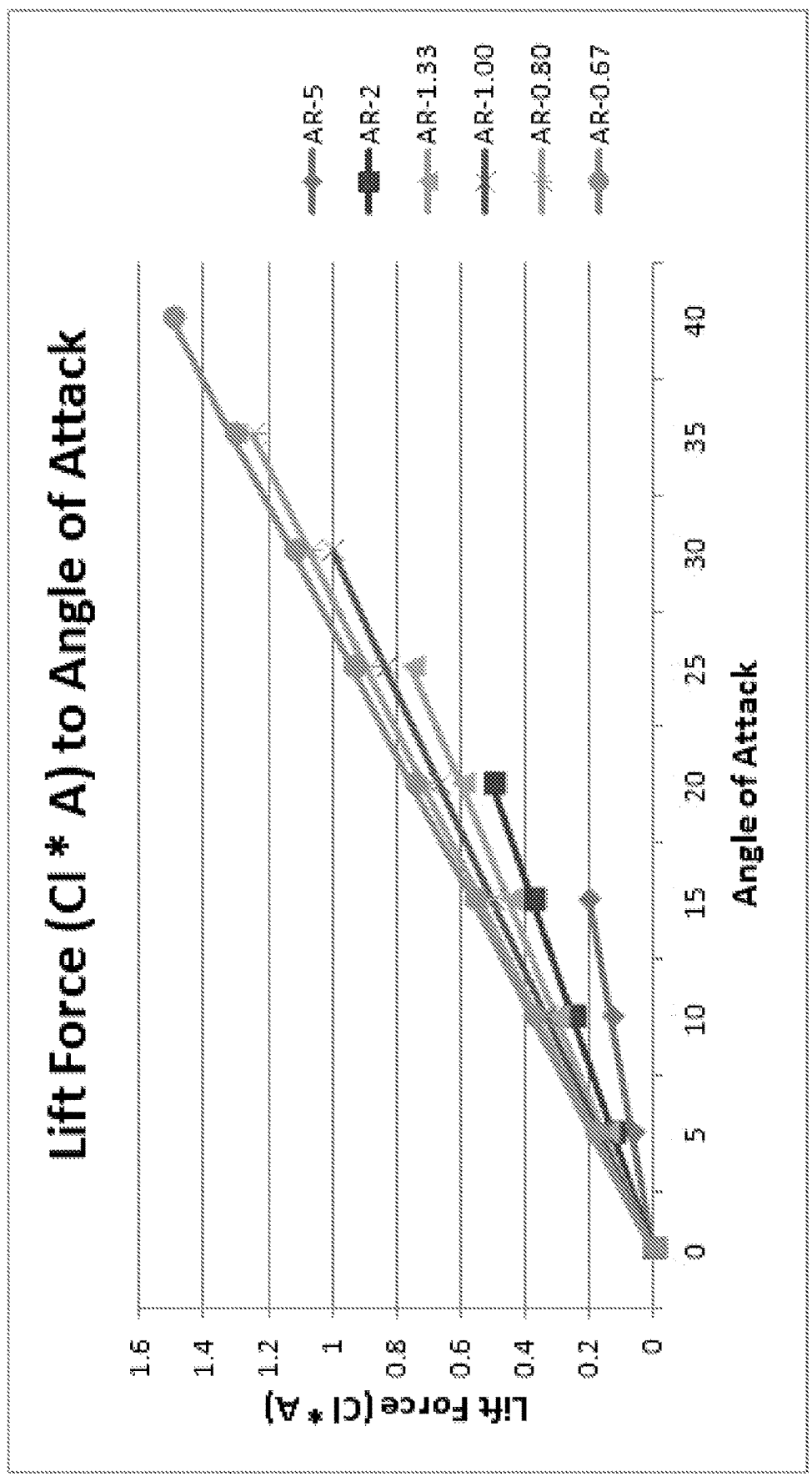
FIG. 24 illustrates a relationship between the lift force, the angle of attack, and the aspect ratio in accordance with the present disclosure.

FIG. 24 shows the relationship between the lift force, angle of attack, and aspect ratio, with the aspect ratio ranging from AR=0.67 to AR=5.0. As shown in FIG. 24, with a constant angle of attack (e.g., 10 degrees), the lift force increases with a decreasing aspect ratio (e.g., aspect ratio decreasing from AR=50 to AR=0.67). Increasing angles of attack increases the product of the two components. For a given aspect ratio (e.g., AR=2.0), the lift force increases with increasing angles of attack. The greatest lift force is generated at lower aspect ratios and greater angle of attack (e.g., AR=0.67 and angle of attack=40 degrees in the example shown in FIG. 24).

Figure 25:
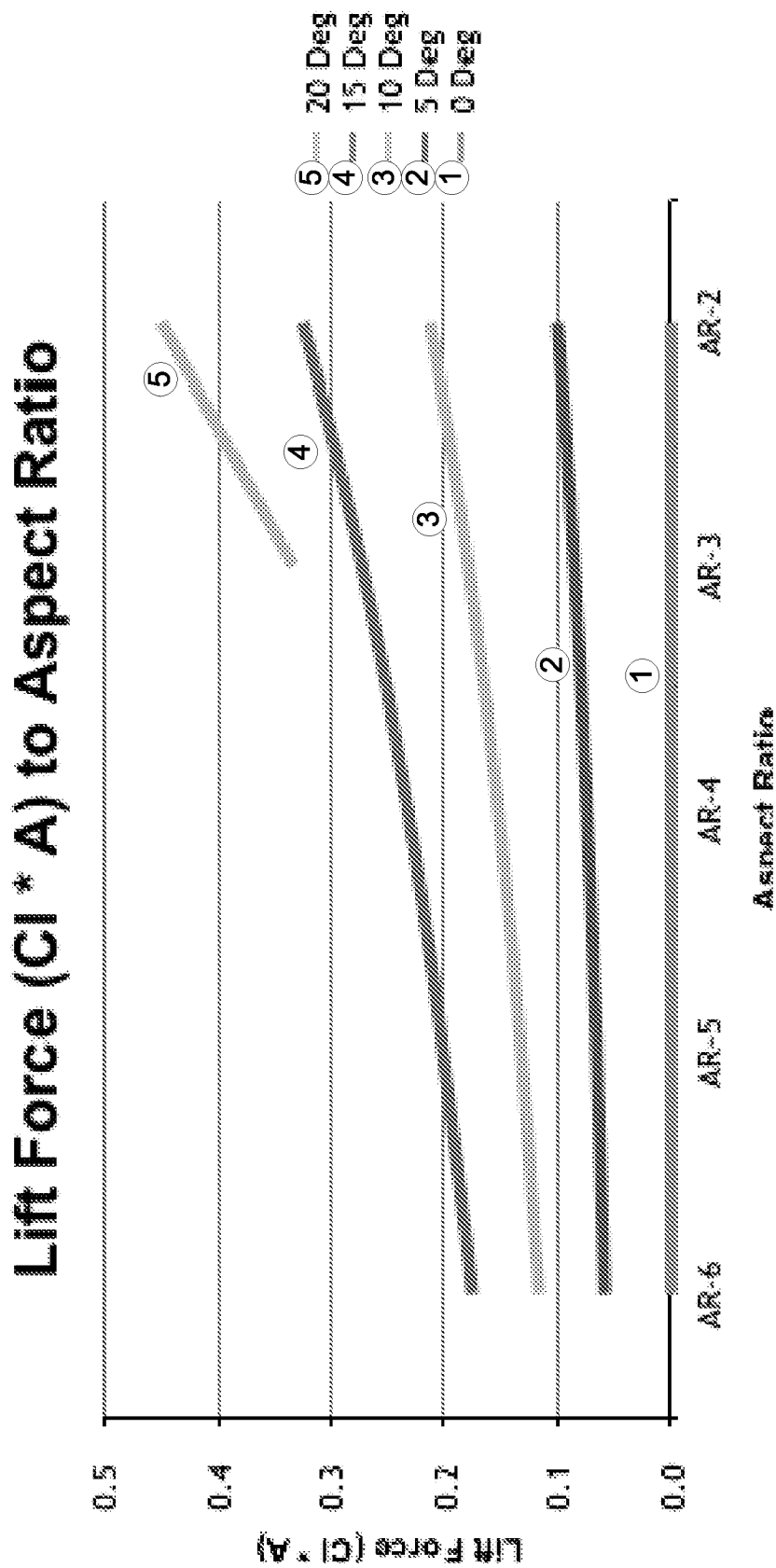
FIG. 25 illustrates a relationship between the lift force, the angle of attack, and the aspect ratio in accordance with the present disclosure.

FIG. 25 shows the relationship between the lift force, angle of attack, and aspect ratio, with aspect ratio ranging from AR=2.0 to AR=6.0. As shown in FIG. 25, for a given aspect ratio, the lift force increases as the angle of attack increases. For a given angle of attack except 0 degree (e.g., 10 degrees), the lift force increases as the aspect ratio decreases.

Extracted power is the product of lift force and the normal velocity of the hydro foil (e.g., hull 105). The relative angle of attack decreases with normal velocity. There are two points when power is not generated. The first is when the foil is stationary and the lifting force is maximized. The second is when the foil's normal velocity is maximized and the relative angle of attack is reduced to zero, reducing the lifting force to zero. The maximum normal velocity is the current velocity times the sine of the maximum angle of attack. The maximum power is generated when the relative angle of attack is about half of the maximum angle of attack. At this point, the coefficient of lift is about half of the maximum coefficient of lift. So the maximum power is the product of the coefficient of lift, foil area, sine of max angle of attack divided by four. The following power curves are the respective force curves multiplied by the sine of the angle of attack divided by four.

Figure 26:
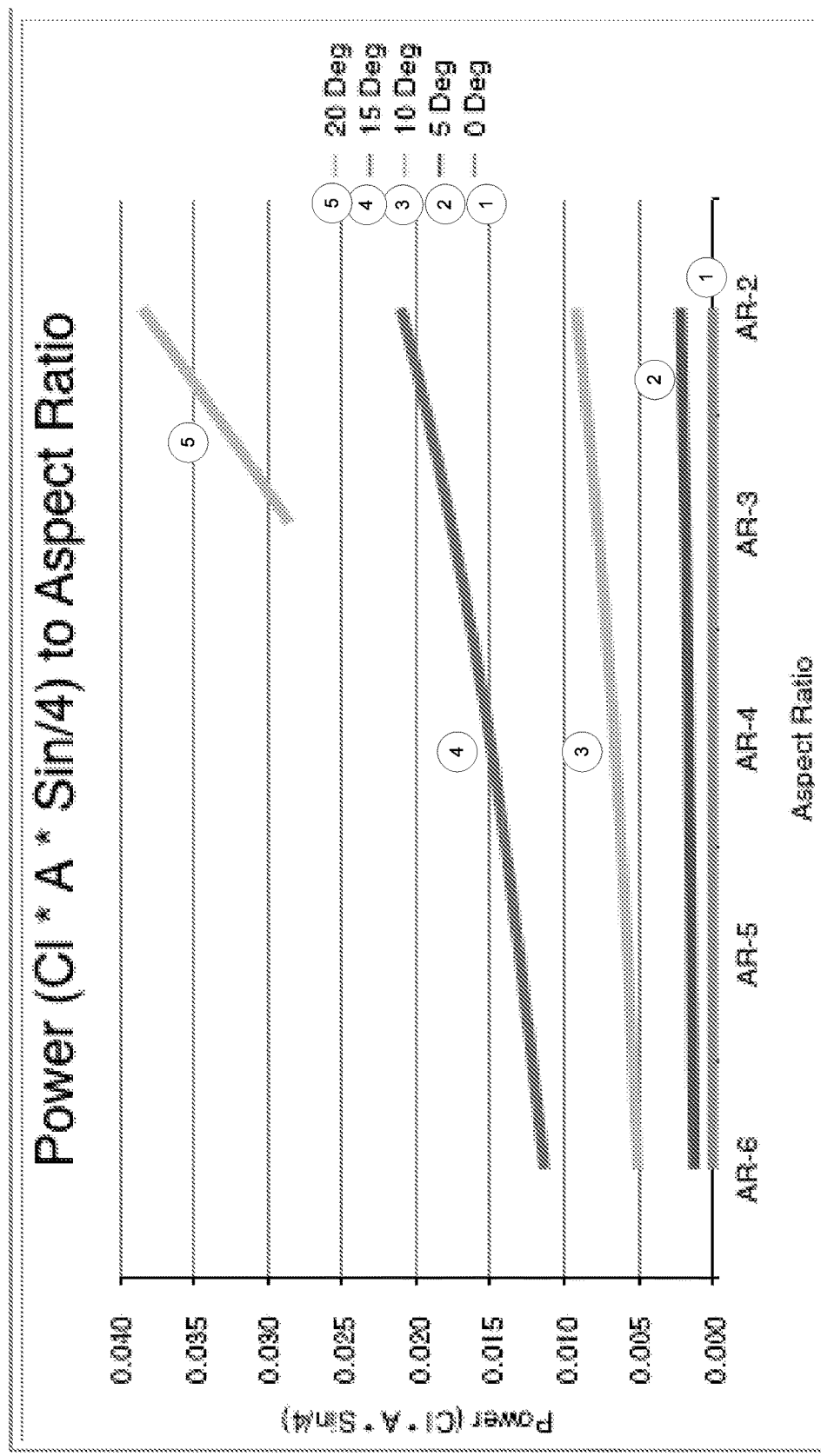
FIG. 26 illustrates a relationship between the power, the angle of attack, and the aspect ratio in accordance with the present disclosure.

FIG. 26 shows the relationship between the power, angle of attack, and aspect ratio, with the aspect ratio ranging from AR=2.0 to AR=6.0. As shown in FIG. 26, for a given aspect ratio, the power increases as the angle of attack increases. For a given angle of attack except 0 degree (e.g., 15 degrees), the power increases as the aspect ratio decreases. Where the greatest power is generated at lower aspect ratios and greater angle of attack (e.g., AR=2.0 and angle of attack=20 degrees in the example shown in FIG. 26).

Figure 27:
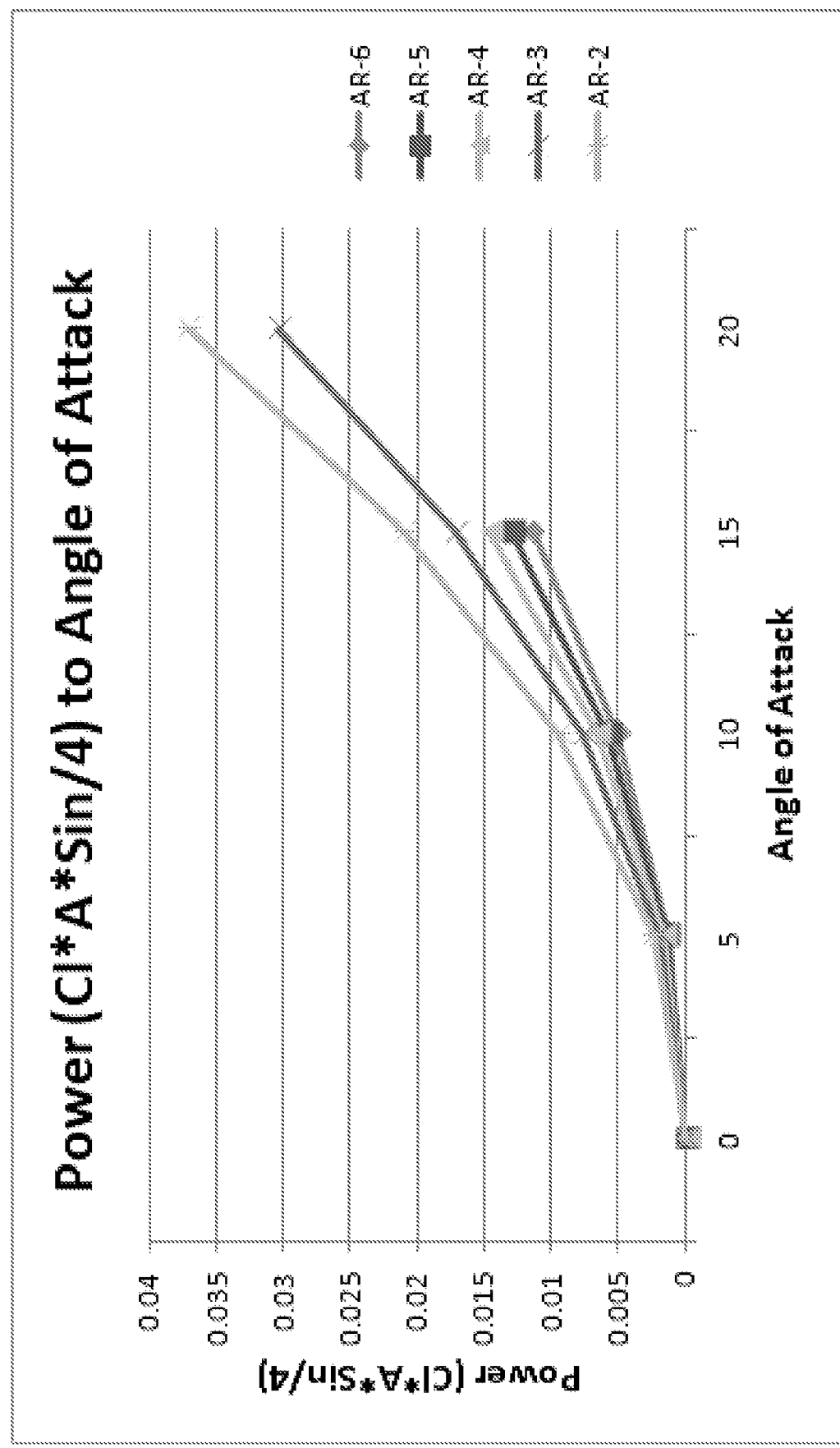
FIG. 27 illustrates a relationship between the power, the angle of attack, and the aspect ratio in accordance with the present disclosure.

FIG. 27 shows the relationship between the power, angle of attack, and aspect ratio, with the aspect ratio ranging from AR=2.0 to AR=6.0. As shown in FIG. 27, for a given aspect ratio, the power increases as the angle of attack increases. For a given angle of attack except 0 degree (e.g., 15 degrees), the power increases as the aspect ratio decreases. Where the greatest power is generated at lower aspect ratios and greater angle of attack (e.g., AR=2.0 and angle of attack=20 degrees in the example shown in FIG. 27).

Figure 28:
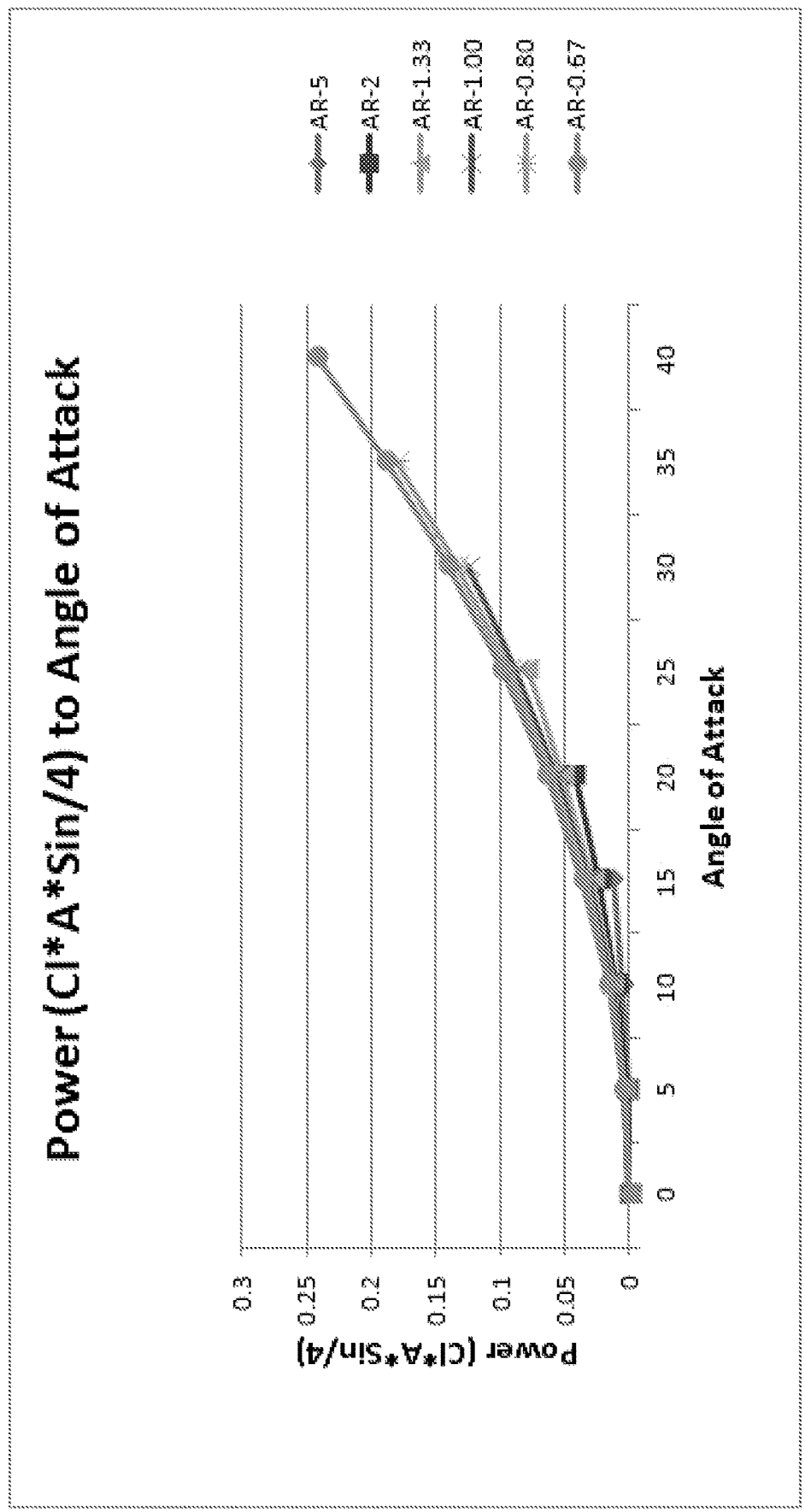
FIG. 28 illustrates a relationship between the power, the angle of attack, and the aspect ratio in accordance with the present disclosure.

FIG. 28 shows the relationship between the power, angle of attack, and aspect ratio, with the aspect ratio ranging from AR=0.67 to AR=5.0. As shown in FIG. 28, for a given aspect ratio, the power increases as the angle of attack increases. For a given angle of attack except 0 degree (e.g., 15 degrees), the power increases as the aspect ratio decreases. Where the greatest power is generated at lower aspect ratios and greater angle of attack (e.g., AR=0.67 and angle of attack=40 degrees in the example shown in FIG. 28).

To provide a relative comparison of the power potential of varying aspect ratios, the power graphs above are normalized by dividing by the potential power of the maximum lift to drag ratio. In FIG. 19, the max lift to drag ratio occurs with an aspect ratio of six (AR=6) at a 5 degrees of angle of attack. All of the potential power values shown in FIGS. 26-28 are divided by the potential power at AR=6 with a 5-degree angle of attack. This gives the maximum lift to drag point a value of one (1). All of the other values are multiple factors compared to this point of reference.

Figure 29:
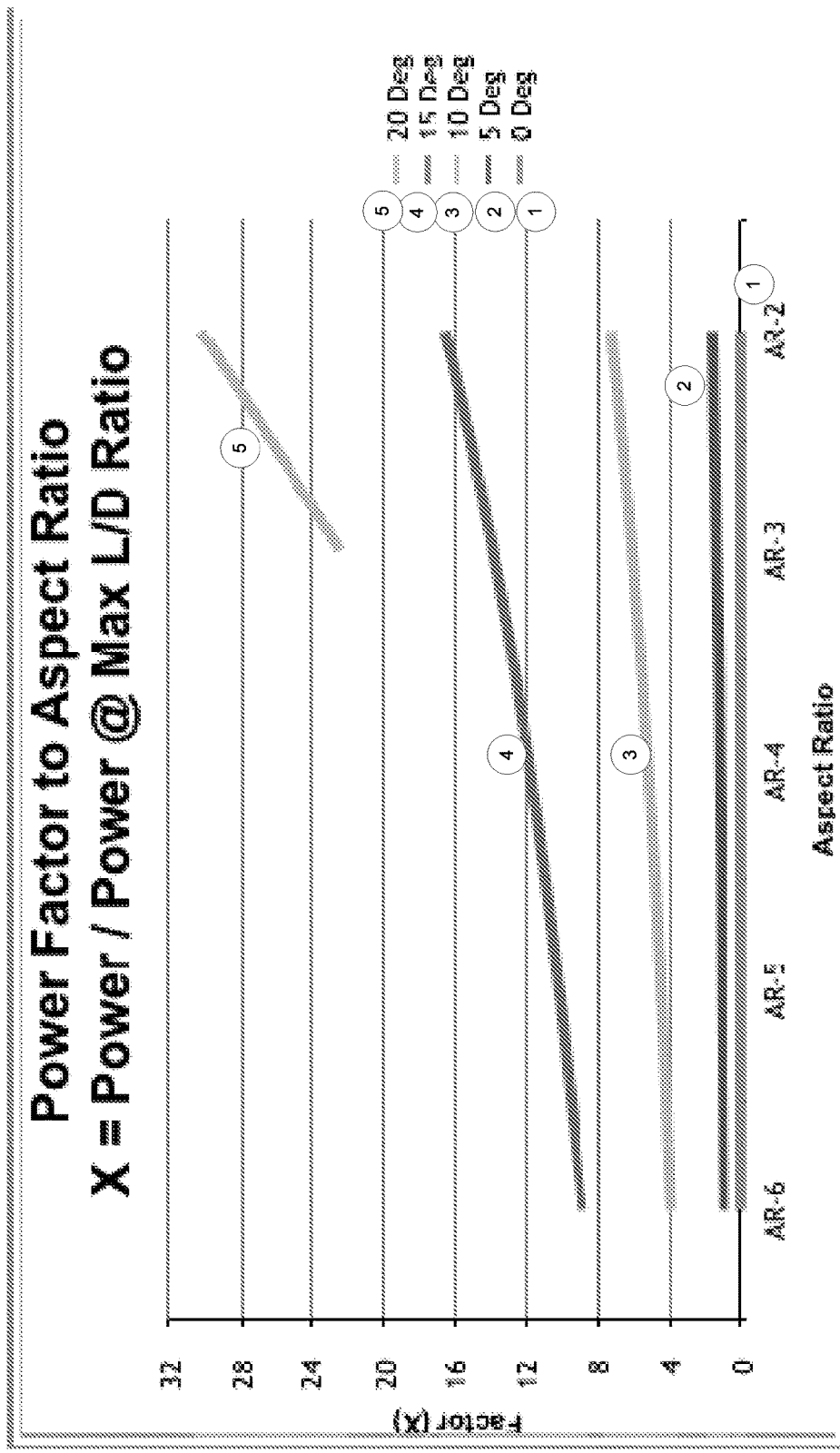
FIG. 29 illustrates a relationship between the power factor, the angle of attack, and the aspect ratio in accordance with the present disclosure.

FIG. 29 shows the relationship between power factor, angle of attack, and aspect ratio, with the aspect ratio ranging from AR=2.0 to AR=6.0. As shown in FIG. 29, for a given aspect ratio, the power factor increases as the angle of attack increases. For a given angle of attack except 0 degree (e.g., 15 degrees), the power factor increases as the aspect ratio decreases.

Figure 30:
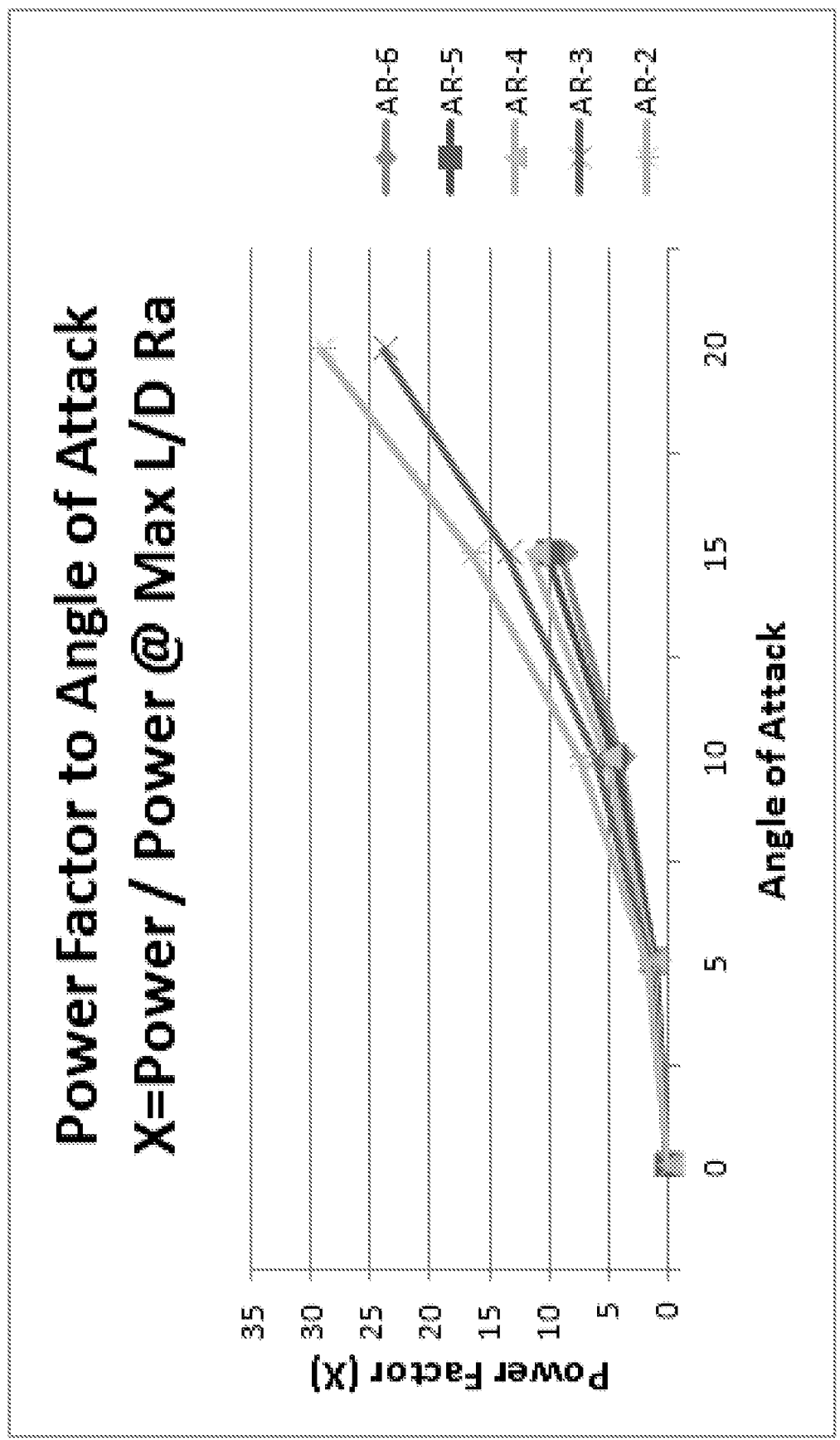
FIG. 30 illustrates a relationship between the power factor, the angle of attack, and the aspect ratio in accordance with the present disclosure.

FIG. 30 shows the relationship between power factor, angle of attack, and aspect ratio, with the aspect ratio ranging from AR=2.0 to AR=6.0. As shown in FIG. 30, for a given aspect ratio, the power factor increases as the angle of attack increases. For a given angle of attack except 0 degree (e.g., 15 degrees), the power factor increases as the aspect ratio decreases.

Figure 31:
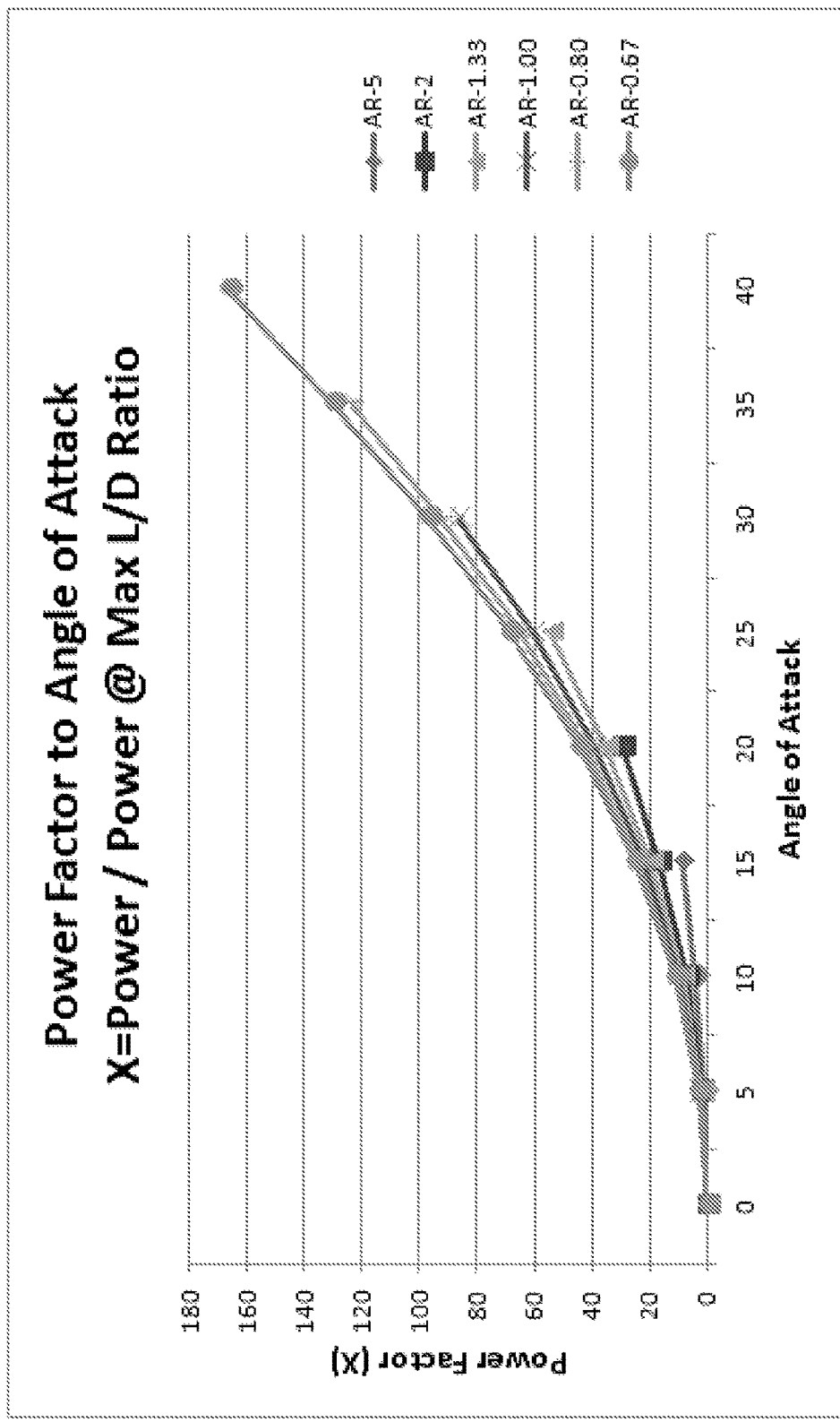
FIG. 31 illustrates a relationship between the power factor, the angle of attack, and the aspect ratio in accordance with the present disclosure.

FIG. 31 shows the relationship between power factor, angle of attack, and aspect ratio, with the aspect ratio ranging from AR=0.67 to AR=5.0. As shown in FIG. 31, for a given aspect ratio, the power factor increases as the angle of attack increases. For a given angle of attack except 0 degree (e.g., 15 degrees), the power factor increases as the aspect ratio decreases.

One of the existing hydropower systems is a Stingray Oscillating Hydrofoil developed by the Engineering Business Ltd. In Great Britain. There are fundamental and drastic distinctions between the disclosed hydrokinetic power source 100 and the Stingray Oscillating Hydrofoil. The design process of the hydrokinetic power source 100 was inspired by a simple and ancient boat design used to ferry passengers and cargo across rivers. The "Stingray" design was inspired by wing (air foil) design. The different design focuses resulted in uniquely different devices trying to accomplish the same task of extracting power from moving currents of water.

The power (lift) surfaces of the two devices are oriented 90 degrees from each other. The surfaces of the hydrokinetic power source 100 are located in the vertical plane. Ship hulls are designed to be long and narrow floating on the surface of the water. To capture the current that hull 105 was extended down (vertically) from the water's surface. The horizontal approach incorporated into the "Stingray" is straight out of aeronautics. Air foils pass horizontally through the air because they are designed to lift the aircraft. Aeronautic studies focus on lift and drag of air foils. This is because lift and drag translates to how much power is required to lift the aircraft off the ground. The "Stingray" took a horizontal air foil and placed it underwater.

Ship and boat designs spend a significant time analysis how the forces of gravity and buoyancy impact the hull. If the force of gravity exceeds the buoyancy force the hull will sink. If the center of gravity is above the center of buoyancy, the hull will capsize. Buoyancy is used to support some of the world's largest structures like super tankers and deep-ocean drilling platforms. The hull 105 in the hydrokinetic power source 100 is a stable floating hull. This simplifies the design because we are using buoyancy to support significant portions of the machine. It also permits us to take advantage of greater economies of scale. The horizontal movement of the hull 105 is substantially not impacted by the vertical forces of buoyancy and gravity.

The documentation on the Stingray only focuses on the aerodynamics of the hydrofoil. The two dominant forces are lift and gravity; buoyancy plays no part in airplane design. For the plane to fly, its lift force must exceed its gravitational force. The only place where buoyancy is discussed is where they are assuming that the buoyancy forces from the hydrofoil balance the weight from the steel arm structure to prevent cyclic loading. The vertical forces of gravity and buoyancy will impact the vertical motion of the Stingray's hydrofoil.

The following is the equation for determining the lift force (L) on a body, where water density is a constant $\rho$, and the flow velocity $U_\infty$ is a given of the considered current. These equation components are constants for the current being considered for power generation. System design has no impact on these two components. The coefficient of lift (CL) is a function of the body's shape placed in the current and its angle of attack. While design can improve the coefficient of lift, there are limits in the application of an occulting body. This is because the body must be symmetrical to develop the same lift force in each direction. With a symmetrical body, the coefficient of lift will be zero where the angle of attack is zero. There are limits as to how much a systems design can affect the coefficient of lift. The surface area of the body (S) is directly under the control of the system's design. The surface area has a direct correlation to the amount of energy the system can extract from a given current. The hydrokinetic power source 100 provides the opportunity to maximize the surface area through its long and deep hull 105. The Stingray's hydrofoil has a relatively small surface area as compared to the size of the mechanical system. If we were to overlay the hydrokinetic power source 100 in the same square volume of the Stingray, the ratio of surface area of the hydrokinetic power source 100 (e.g., the hull 105) to the Stingray is in the order of magnitude of 5 to 1.

The design approach for the hydrokinetic power source 100 focused on translating the linear (oscillating) motion of the hull 105 to a rotational motion of the flywheel 145 (crank shaft), like a piston in a car or steam engine. This design goal established the velocity and acceleration profile of the hull 105. This profile dictates the angle of attack of the hull 105 that varies from zero to the maximum angle of attack and back to zero. All of this is designed to create a rotational motion to drive a generator.

The "Stingray" documentation indicates the generator is driven through an oscillating motion. As the hydroplane rises and falls, oil is pushed in different directions across the hydraulic motor, which in turn causes it to turn one way and then the other. The oscillating hydraulic motor drives the generator. The literature indicates the "apparent" angle of attack does not very with hydrofoil position. The hydrofoil's apparent angle of attack, relative to the oncoming current, is maintained at its optimum angle. The hydraulic control system is used to overcome the pitching moment on the hydrofoil, and to stop its motion and return the cycle in an opposite direction. This characteristic is the single most limiting factor of the Stingray device. The Stingray's intended operation is to maintain a constant angle of attack, at maximum lift, to generate the greatest force and power for the entire swing and then the angle of attack is rapidly changed to the opposite direction at the end of the oscillation.

In contrast, the angle of attack of the hull 105 is controlled by two control arms 135 and a tie arm 130. This provides a mechanical system that continuously varies the angle of attack through the entire motion of the hull 105. It is designed for the current's forces to hold the control pin 210 of the hull 105 against the control point (e.g., 220 or 221) on the tie arm 130. This control mechanism is fully mechanical and does not require an external source of energy. With the dynamic control system, external power is required to move the control point 210 on the single control arm 135. The required movement of the control point (e.g., 220 or 221) is relatively minimal given that the control pin 210 of the hull 105 moves in a nearly circular motion. Also the placement of the pivot point of the hull 105 minimizes the force on the control pin 210 and minimized the energy required to move the control point (e.g., 220 or 221) of the control arm 135.

In contrast, the Stingray's design requires extensive power to control its angle of attack. Holding the hydrofoil stably at its optimum angle of attack is critical in the Stingray's design. The Stingray's hydrofoil is connected at its leading edge to the systems arm. This connection point maximizes the pivot point's torque generated by the lift of the hydrofoil. The hydrofoil's angular relation to the arm is controlled by hydraulic pistons attached to the hydrofoil and arm. The hydraulic pistons operate over a wide range of motion to adjust the hydrofoils relative angle with the arm from an acute angle to obtuse angle. The long travel distance against a strong force results in significant power requirements to ensure the Stingray's hydrofoil's apparent angle of attack, relative to the oncoming current, is maintained at its optimum angle. Up to 15% of the device power rating is spent in firing hydraulic pressure accumulators to rapidly change the angle of attack when the system changes the direction of oscillation. This characteristic is the most limiting factor of the Stingray device.

The vertical orientation of the hydrokinetic power source 100 provides the opportunity to locate the majority (or at least some parts of) of the mechanical systems above the surface of the water. Also the complete control system is located above the surface of the water. By limiting the number of submerged components it reduces the maintenance requirements resulting from the aquatic environment. It also reduces the cost of maintenance due to easier access.

In contrast, the Stingray is a totally submerged device. All of the mechanical and control systems are exposed to the underwater marine environment. This increases the systems' required maintenance. Special equipment and techniques are required to provide submarine maintenance. The other option is to raise the entire system and service it on a ship or dry dock. Either approach results in a relating high cost of maintenance.

The design of the hydrokinetic power source 100 permits the entire electrical system to be installed above the water's surface. This allows for the use of conventional electrical equipment in conventional housings. This also allows standard electricians to perform the installation and maintenance of the system.

In contrast, the Stingray is a totally submerged device including the electrical generation system. The Stingray includes a pod that is a sealed pressure vessel that houses the subsea electrical equipment, main generator/pump assembly, etc. Special equipment and techniques are required to provide submarine maintenance. The other option is to raise the entire system and service it on a ship or dry dock. Either approach results in a relating high cost of maintenance.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the broadest scope consistent with the principles and novel features disclosed herein. It is intended that the specification and examples be considered as exemplary only, with a true scope being indicated by the following claims and their equivalents.

What is claimed is:

1. A system, comprising:
    a body having at least two surfaces, the body configured to be located at least partially below a surface of a body of water moving in a first direction; and
    a mechanical system connected to the body;
    wherein:
        the mechanical system is configured to allow the movement of the body of water in the first direction to move the body back and forth in a plane parallel to the surface of the body of water in a second direction and a third direction;
        the second and the third directions are substantially perpendicular to the first direction;
        the mechanical system is configured to translate the movement of the body to a rotor of an electrical generator;
        an angle of the body is substantially parallel to a flow of the body of water in the first direction as the body reaches a first end point or a second end point of a traverse between the second direction and the third direction;
        the angle of the body relative to the flow of the body of water in the first direction varies as the body traverses between the second direction and the third direction;
        the angle of the body relative to the flow of the body of water in the first direction increases as the body moves from the first endpoint to a midpoint of the traverse between the second direction and the third direction;
        the angle of the body relative to the flow of the body of water in the first direction decreases as the body moves from the midpoint to the second endpoint of the traverse between the second direction and the third direction; and
        the angle of the body relative to the flow of the body of water in the first direction is greater than 0 degrees as the body traverses between the second direction and the third direction to generate lift;
    wherein the body further comprises a control pin extending from a side surface of the body;
    wherein the mechanical system further comprises a tie arm including a first control point and a second control point; and
    wherein the control pin is configured to swing between the first control point and the second control point of the tie arm as the body traverses between the second direction and the third direction.

2. A system, comprising:
    a body having at least two surfaces, the body configured to be located at least partially below a surface of a body of water moving in a first direction;
    a mechanical system connected to the body; and
    a control system coupled to the mechanical system;
    wherein:
        the mechanical system is configured to allow the movement of the body of water in the first direction to move the body back and forth in a plane parallel to the surface of the body of water in a second direction and a third direction;
        the second and the third directions are substantially perpendicular to the first direction;
        the mechanical system is configured to translate the movement of the body to a rotor of an electrical generator;
        an angle of the body is substantially parallel to a flow of the body of water in the first direction as the body reaches a first end point or a second end point of a traverse between the second direction and the third direction;
        the angle of the body relative to the flow of the body of water in the first direction varies as the body traverses between the second direction and the third direction;
        the angle of the body relative to the flow of the body of water in the first direction increases as the body moves from the first endpoint to a midpoint of the traverse between the second direction and the third direction;
        the angle of the body relative to the flow of the body of water in the first direction decreases as the body moves from the midpoint to the second endpoint of the traverse between the second direction and the third direction;
        the angle of the body relative to the flow of the body of water in the first direction is greater than 0 degrees as the body traverses between the second direction and the third direction to generate lift;
    wherein the control system is an electromechanical control system, a digital control system implementing digital controls, or an intelligent control system comprising a computer controlling one or more of a hydraulic element and a servo motor;
    wherein the mechanical system further comprises a control arm having an adjustable length,
    wherein the control system is coupled to the adjustable length control arm, and
    wherein the control system is configured to adjust the length of the control arm.

3. The system of claim 2, wherein the control system is configured to adjust the length of the control arm to control an angle of attack of the body as the body traverses between the second direction and the third direction.

4. A system, comprising:
    a body having at least two surfaces, the body configured to be located at least partially below a surface of a body of water moving in a first direction; and
    a mechanical system connected to the body;
    wherein:
        the mechanical system is configured to allow the movement of the body of water in the first direction to move the body back and forth in a plane parallel to the surface of the body of water in a second direction and a third direction;

the second and the third directions are substantially perpendicular to the first direction; the mechanical system is configured to translate the movement of the body to a rotor of an electrical generator;

an angle of the body is substantially parallel to a flow of the body of water in the first direction as the body reaches a first end point or a second end point of a traverse between the second direction and the third direction;

the angle of the body relative to the flow of the body of water in the first direction varies as the body traverses between the second direction and the third direction;

the angle of the body relative to the flow of the body of water in the first direction increases as the body moves from the first endpoint to a midpoint of the traverse between the second direction and the third direction;

the angle of the body relative to the flow of the body of water in the first direction decreases as the body moves from the midpoint to the second endpoint of the traverse between the second direction and the third direction; and the angle of the body relative to the flow of the body of water in the first direction is greater than 0 degrees as the body traverses between the second direction and the third direction to generate lift;

wherein the body further comprises:
a control pin extending from the first surface of the body, wherein the control pin is not coupled to the mechanical system at a fixed point, and
a hinge pin extending from a first surface of the body,
wherein the hinge pin is spaced apart from a vertical axis for a center of force of the body,
wherein the mechanical system is coupled to the hinge pin, and
wherein an interaction between the hinge pin and the mechanical system creates lift and allows a greater surface area on a leading edge of the body to experience greater hydrostatic pressure than a trailing edge of the body as the body traverses between the second direction and the third direction.

5. The system of claim 4, wherein the hinge pin comprises a first power arm hinge pin;
wherein the body further comprises:
a second power arm hinge pin extending from a second surface of the body,
wherein the mechanical system further comprises:
an upper power arm coupled to the first power arm hinge pin,
a lower power arm coupled to the second power arm hinge pin,
a tie arm coupled to the control pin, and
a control arm coupled to the tie arm,
wherein the upper power arm and the lower power arm are configured to allow the body to rotate with respect to the upper power arm and the lower power arm, and
wherein the tie arm and the control arm are configured to allow the body to switch between traversing between the second direction and the third direction.

\* \* \* \* \*